United States Patent
Wang et al.

(10) Patent No.: US 11,970,199 B2
(45) Date of Patent: Apr. 30, 2024

(54) ELECTRIC VEHICLE

(71) Applicant: Globe (Jiangsu) Co., Ltd., Changzhou (CN)

(72) Inventors: Yu Wang, Changzhou (CN); Yu Xiao, Changzhou (CN); Shouchuan Feng, Changzhou (CN); Zhibing Liu, Changzhou (CN); Wanchun Jiao, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 0 days.

(21) Appl. No.: 17/993,840

(22) Filed: Nov. 23, 2022

(65) Prior Publication Data

US 2023/0089693 A1 Mar. 23, 2023

Related U.S. Application Data

(63) Continuation of application No. PCT/CN2021/099070, filed on Jun. 9, 2021.

(30) Foreign Application Priority Data

Jun. 12, 2020 (CN) .......................... 202021083165.7
Jun. 12, 2020 (CN) .......................... 202021084886.X
Jul. 2, 2020 (CN) .......................... 202021261737.6
Jul. 2, 2020 (CN) .......................... 202021261776.6
Jul. 2, 2020 (CN) .......................... 202021261798.2

(51) Int. Cl.
*B62B 5/00* (2006.01)

(52) U.S. Cl.
CPC ............ *B62B 5/0053* (2013.01); *B62B 5/004* (2013.01)

(58) Field of Classification Search
CPC ....... B62B 5/0053; B62B 5/004; B62B 3/005; B62B 5/0006; B62B 2203/05; B62B 3/1476; B62B 5/06; B62B 5/0076; B62B 5/0414; B62B 5/0447; B62B 3/1416
See application file for complete search history.

(56) References Cited

U.S. PATENT DOCUMENTS 6,470,981 B1 * 10/2002 Sueshige .............. B60K 7/0007
                                                        180/65.6
2011/0000175 A1 * 1/2011 Lahey .................... A01D 34/68
                                                        56/10.8
2018/0215404 A1    8/2018 Hayashi et al.
(Continued)

FOREIGN PATENT DOCUMENTS

CN         201751602 U  *  2/2011
CN         203681446 U  *  7/2014
(Continued)

OTHER PUBLICATIONS

Translated CN-105946915-A (Year: 2023).*
(Continued)

*Primary Examiner* — James A Shriver, II
*Assistant Examiner* — Ian Bryce Shelton

(57) ABSTRACT

An electric vehicle is provided, including: a main body, traveling wheels, a drive assembly and a controller. The traveling wheels are arranged on the main body. The drive assembly is arranged on the main body and includes a hub motor. The hub motor is arranged on the traveling wheels. The controller is used to control the hub motor.

18 Claims, 25 Drawing Sheets

(56) References Cited

U.S. PATENT DOCUMENTS

| | | | | |
|---|---|---|---|---|
| 2019/0023265 | A1* | 1/2019 | Takeda | B60W 10/18 |
| 2020/0196521 | A1* | 6/2020 | Xiao | A01D 34/6812 |
| 2021/0039697 | A1* | 2/2021 | Shibata | B62B 5/0053 |
| 2021/0039702 | A1* | 2/2021 | Kutsuna | B60Q 5/001 |
| 2022/0274635 | A1* | 9/2022 | Zhang | B62B 1/18 |
| 2022/0410956 | A1* | 12/2022 | Nashimoto | H01M 50/242 |

FOREIGN PATENT DOCUMENTS

| | | | | |
|---|---|---|---|---|
| CN | 203681446 U | | 7/2014 | |
| CN | 105946915 A | * | 9/2016 | |
| CN | 105946915 A | | 9/2016 | |
| CN | 109392466 A | * | 3/2019 | A01D 34/6806 |
| CN | 110495302 A | * | 11/2019 | A01D 69/00 |
| CN | 112061215 A | * | 12/2020 | A01C 23/04 |
| EP | 3090920 A1 | | 11/2016 | |
| KR | 20110005641 U | * | 6/2011 | |

OTHER PUBLICATIONS

Translated CN-203681446-U (Year: 2023).*
Supplementary European Search Report for corresponding application 218212108 filed Dec. 9, 2022, Mail date Nov. 1, 2023.

* cited by examiner

ELECTRIC VEHICLE

TECHNICAL FIELD

The disclosure relates to the field of electric tools, in particular to an electric vehicle.

BACKGROUND

The vehicle is a frequently used and indispensable tool in gardening operations. It is mainly used for short-distance transportation of goods. The existing vehicles are mainly moved artificially. When there are a large amount of goods or the vehicle needs to go uphill, due to the limited artificial thrust, the vehicle cannot be moved when the load is too large, or it will cause rollover. Therefore, traditional vehicles are inconvenient, laborious, and unsafe when used.

Although a variety of electric vehicles appear on the market to solve the above problems, most electric vehicles usually use batteries as a power supply device and the batteries are installed at the bottom of the hopper of the vehicle. Therefore, the vehicle needs to be lifted up when charging or when the battery needs to be replaced, which is inconvenient. Moreover, the structure of the existing electric vehicle is unreasonable, it is inconvenient to push and the effect is not good.

SUMMARY

The disclosure provides an electric vehicle, comprising:
a main body,
traveling wheels, arranged on the main body,
a drive assembly, arranged on the main body, wherein the drive assembly includes a hub motor which is arranged on the traveling wheels, and
a controller, used to control the hub motor.

The disclosure provides an electric vehicle, the electric vehicle comprises a main body, traveling wheels, arranged on the main body, a drive assembly, arranged on the main body, wherein the drive assembly includes a hub motor which is arranged on the traveling wheels, and a control assembly, arranged on an armrest frame, used to control the electric vehicle, wherein the control assembly includes a control panel.

In summary, the disclosure provides an electric vehicle. A power supply assembly is arranged at the rear and/or bottom of the main body, and a battery pack is detachably assembled in a battery pack accommodating part, which is convenient for taking and replacing the battery pack and improves work efficiency.

DETAILED DESCRIPTION

The following describes the implementation of the disclosure through the specific embodiments. Those skilled in the art can easily understand the other advantages and effects of the disclosure from the content disclosed in this specification. The disclosure can also be implemented or applied through other different specific embodiments. The details in this specification can also be based on different viewpoints and applications, and various modifications or changes can be made without departing from the disclosure.

It should be noted that the drawings provided in the embodiments only illustrate the basic idea of the disclosure in a schematic manner. The figures only show the assemblies related to the disclosure instead of the number, shape, and drawing size of the assemblies in actual implementation. In the actual implementation, the type, quantity and proportion of each assembly can be changed at will, and the layout type of the assemblies may also be more complicated.

Figure 1:
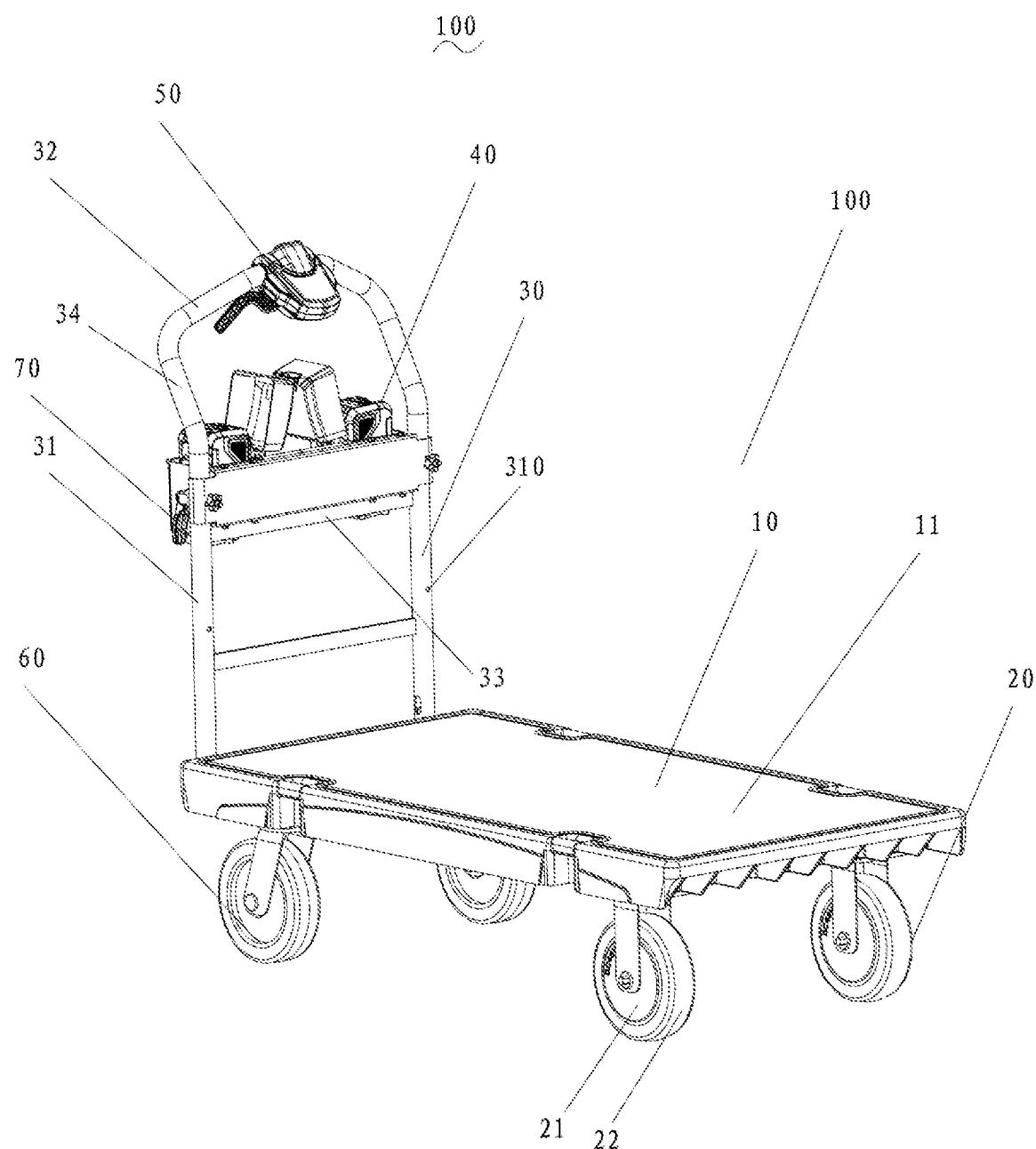
FIG. 1 is a first schematic perspective view of an electric vehicle according to an embodiment of the disclosure.

As shown in FIG. 1, the disclosure provides an electric vehicle 100, which includes a main body 10, a drive assembly 20 installed on the main body 10 and driving the main body 10 to move, an armrest frame 30 installed on the main body 10, a power supply assembly 40 installed on the armrest frame 30 and supplying power to the drive assembly 20, and a control assembly 50 installed on the armrest frame 30 and controlling the electric vehicle 100.

Figure 2:
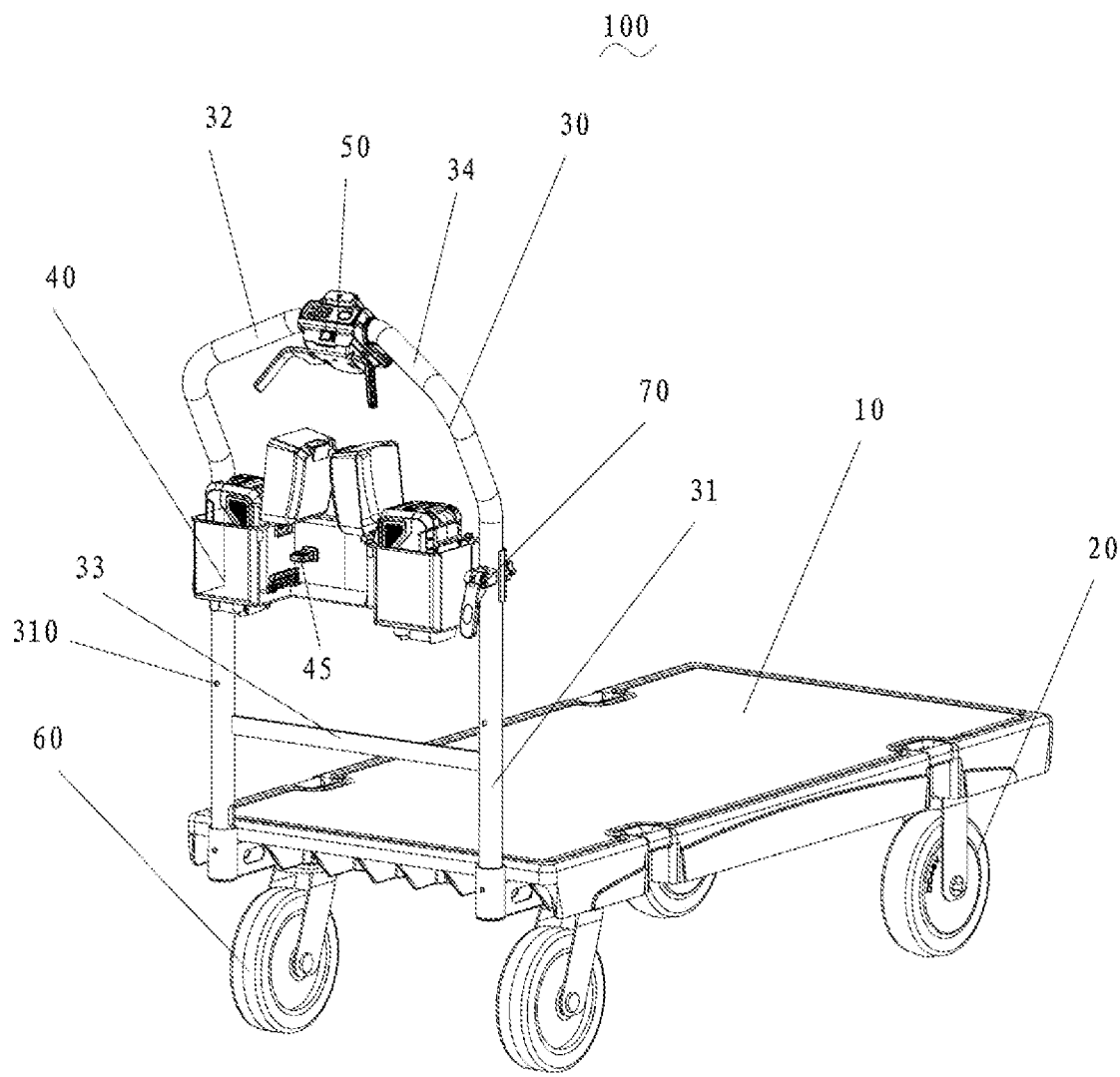
FIG. 2 is a second schematic perspective view of the electric vehicle shown in FIG. 1 from another perspective.
Figure 3:
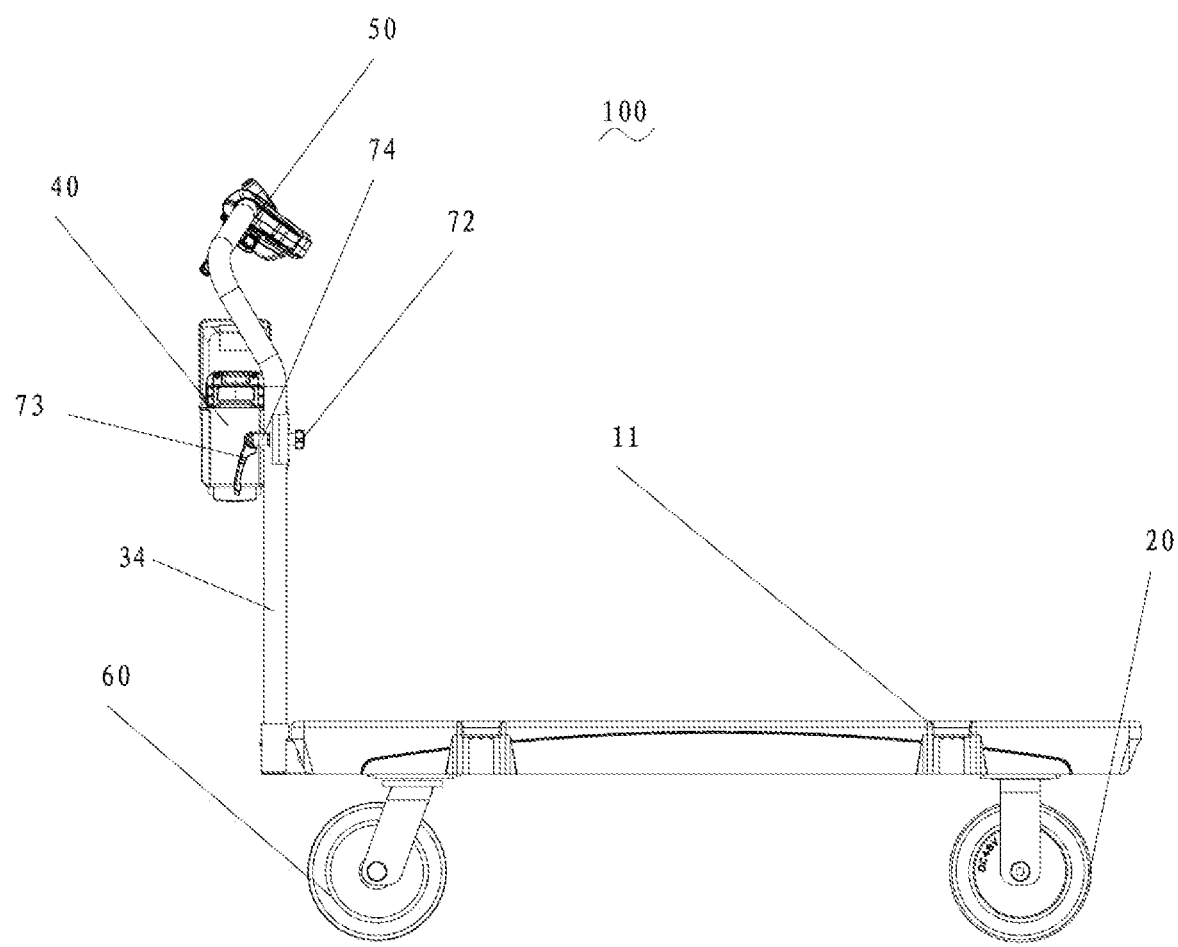
FIG. 3 is a side schematic view of a battery pack assembly of the electric vehicle shown in FIG. 1 installed on a first side of a first height.
Figure 4:
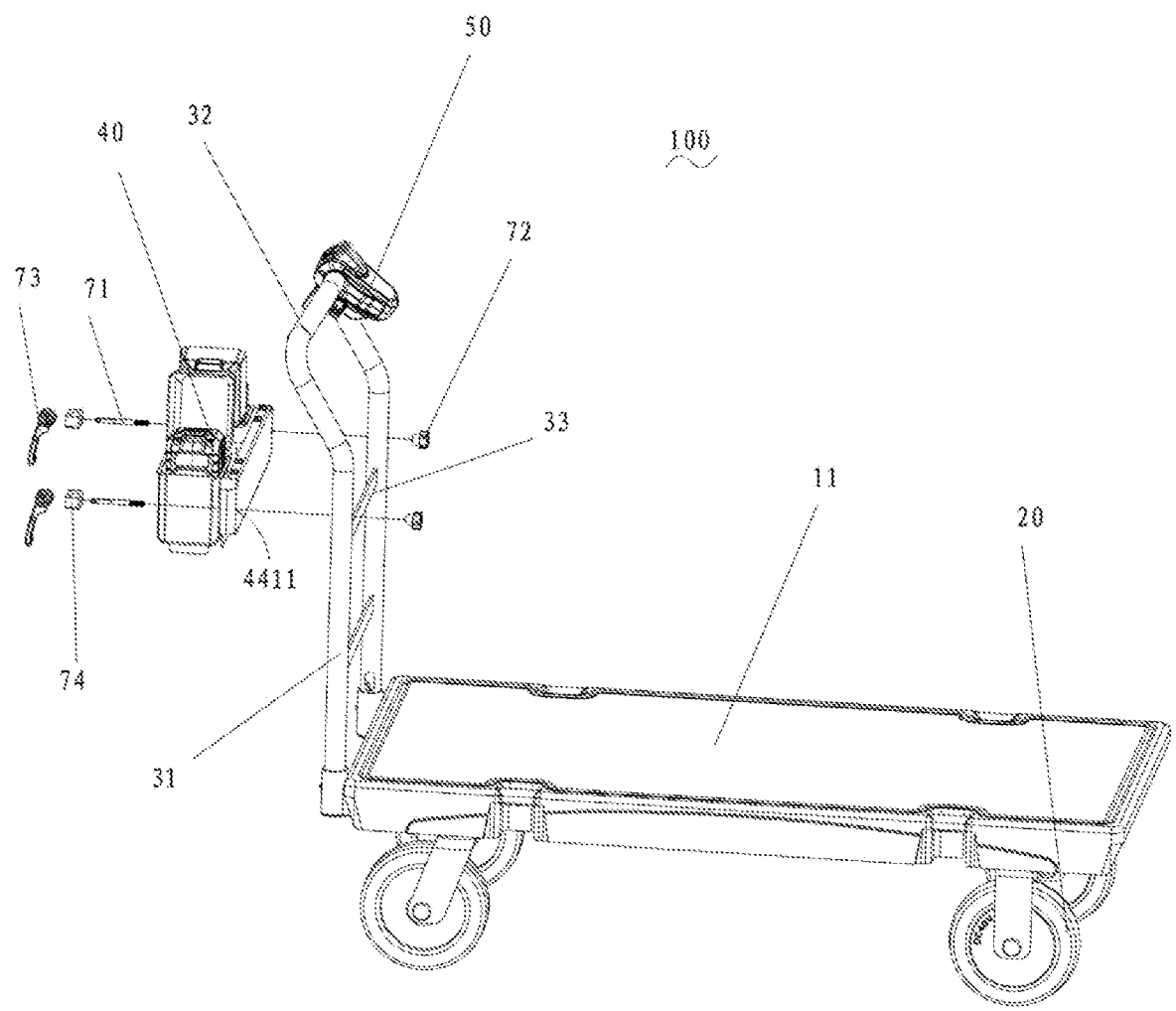
FIG. 4 is a side schematic view of the electric vehicle shown in FIG. 3 after separation from the battery pack assembly.
Figure 5:
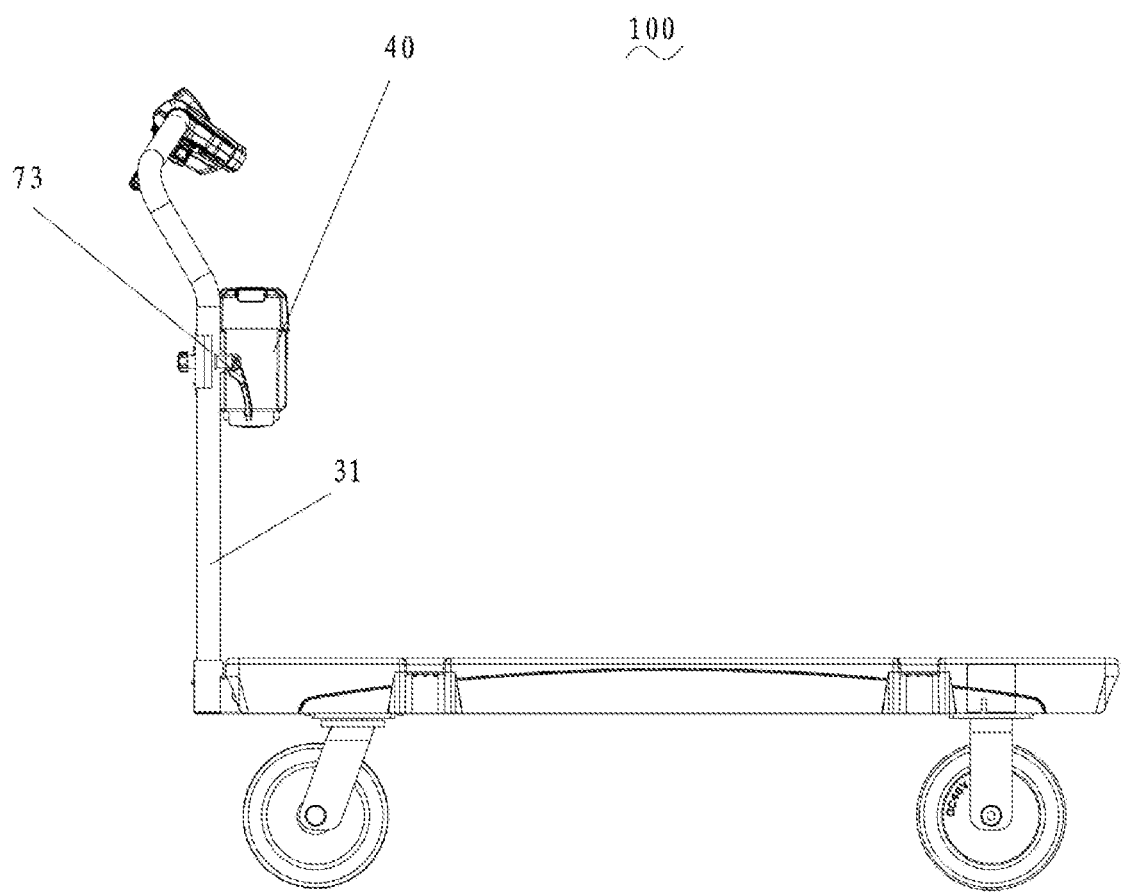
FIG. 5 is a side schematic view of the battery pack assembly of the electric vehicle shown in FIG. 3 installed on a second side of the first height which is opposite to the first side.
Figure 6:
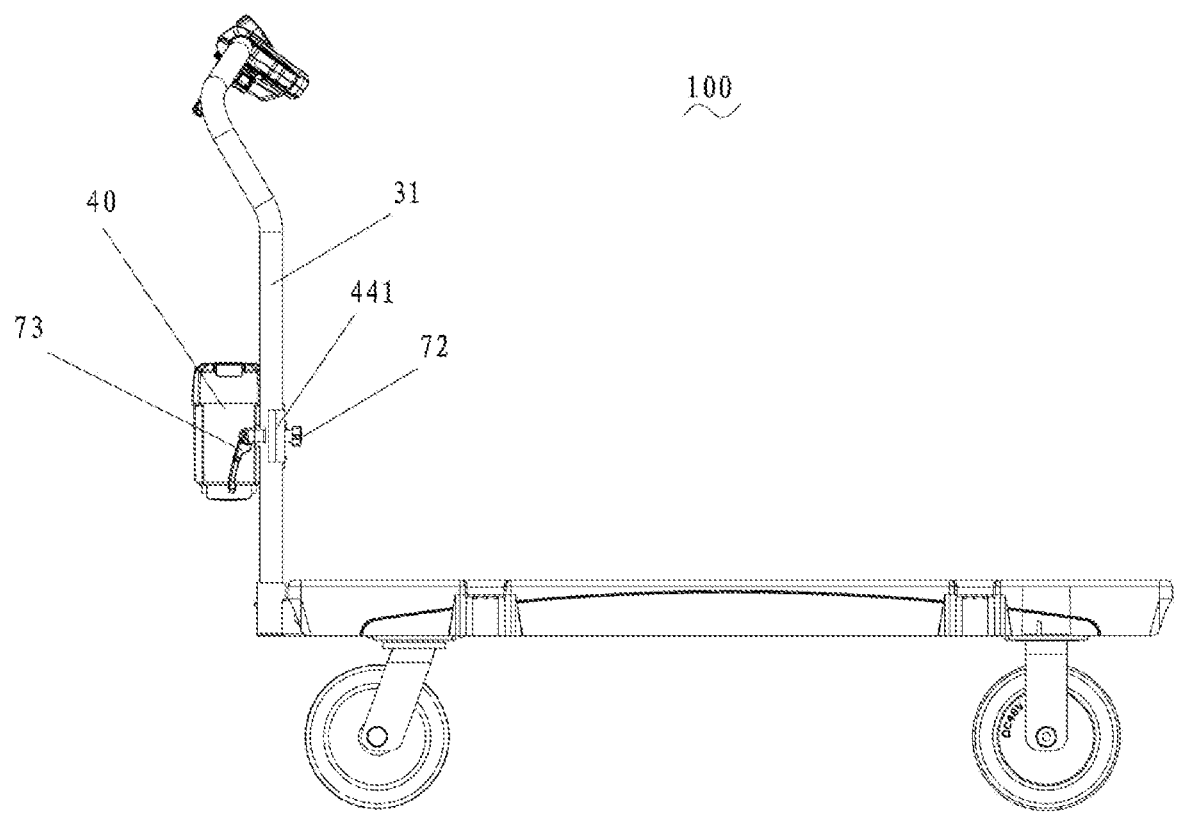
FIG. 6 is a side schematic view of a battery pack assembly of the electric vehicle shown in FIG. 1 installed on a first side of a second height.
Figure 7:
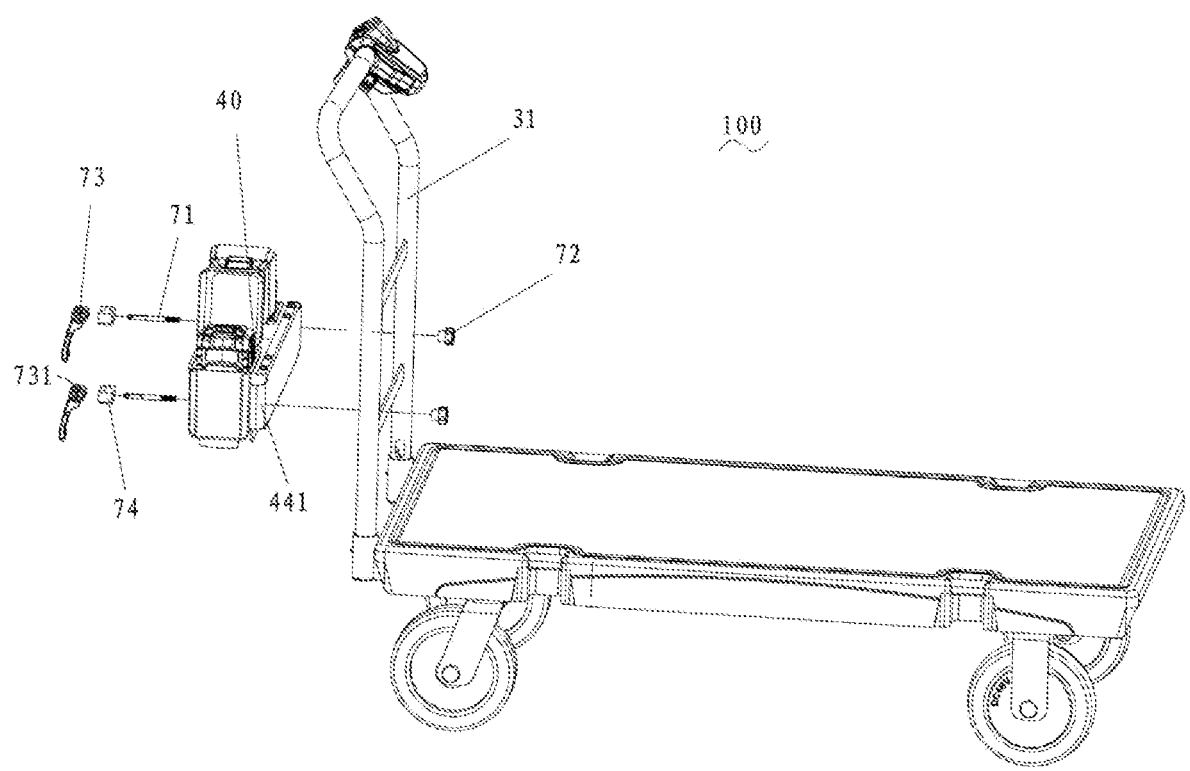
FIG. 7 is a side schematic view of the electric vehicle shown in FIG. 6 after separation from the battery pack assembly.
Figure 8:
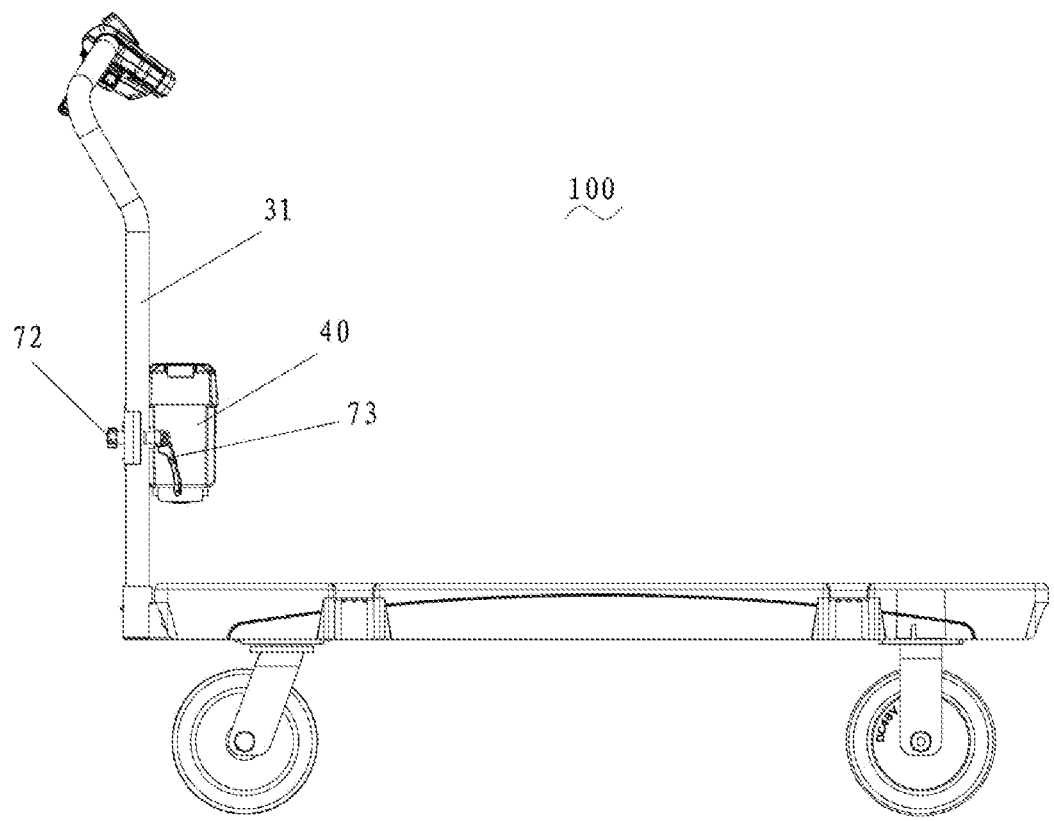
FIG. 8 is a side schematic view of the battery pack assembly of the electric vehicle shown in FIG. 6 installed on a second side of the second height which is opposite to the first side.

As shown in FIG. 1 and FIG. 2, the main body 10 includes a carrying part 11 horizontally arranged, and the carrying part 11 is used to carry goods. The main body 10 can be used as a frame. In some embodiments, a body can also be provided on the main body 10, for example, a vehicle body or a carriage may be provided on the main body 10. In this embodiment, the upper surface of the carrying part 11 is flat, but in other embodiments, the shape of the upper surface of the carrying part 11 can also be set as required. The drive assembly 20 is installed below the carrying part 11. In this embodiment, the drive assembly 20 may include a hub motor 21 installed at the bottom of the main body 10, and wheels 22 are installed on the hub motor 21. The electric vehicle 100 also includes universal wheels 60 installed under the carrying part 11. In this embodiment, the universal wheels 60 are located on a side of the main body 10 close to the armrest frame 30, and the drive assembly 20 is located on a side of the main body 10 away from the armrest frame 30. However, in other embodiments, the drive assembly 20 can also be arranged on the side of the main body 10 close to the armrest 30, and the universal wheels 60 can also be located on the side of the main body 10 away from the armrest 30.

As shown in FIG. 1 and FIG. 2, the armrest frame 30 is installed on the main body 10 and is perpendicular to the carrying part 11. However, in other embodiments, the angle between the armrest frame 30 and the carrying part 11 can be set as required, which is not limited in the disclosure. The armrest frame 30 includes a frame body 34 and a bar 33 installed on the frame body 34. The frame body 34 includes a cross-bar part 32 and a pair of arm parts 31 formed by bending and extending outward from two ends of the cross-bar part 32 respectively. The cross-bar part 32 is roughly V-shaped, and the pair of arm parts 31 is arranged parallel to each other. The bar 33 is installed between the pair of arm parts 31 and is roughly perpendicular to the arm parts 31. The end of the arm parts 31 away from the cross-bar part 32 is installed on the main body 10. The arm parts 31 is provided with at least two mounting holes 310 extending through the arm parts 31 along the vertical direction. In this embodiment, the arm parts 31 are fixedly installed on the main body 10. However, in other embodiments, the arm parts 31 can also be pivotally installed on the main body 10, so that the angle between the arm parts 31 and the carrying part 11 can be adjusted as required to meet different requirements. The bar 33 is located between the pair of arm parts 31, and its two ends are respectively fixed on the pair of arm parts 31 to enhance the rigidity of the pair of arm parts 31 in the horizontal direction. The bar 33 may also be configured to support a battery pack base 41 or a power supply assembly 40 to share the force between the battery pack base 41 and the arm parts 31. In this embodiment, there are two bars 33, but in other embodiments, the number of the bars 33 can be set as required, which is not limited in the disclosure. In this embodiment, the armrest frame 30 is roughly U-shaped, but in other embodiments, the shape of the armrest frame 30 can also be set as required.

As shown in FIG. 1-FIG. 10, the power supply assembly 40 includes a battery pack base 41 installed on the armrest frame 30, at least one battery pack 42 replaceably housed in the battery pack base 41, and a control panel 43 housed in the battery pack base 41. The battery pack base 41 is detachably installed on the armrest frame 30, which means that the power supply assembly 40 is detachably installed on the armrest frame 30. In this embodiment, there are two battery packs 42. Of course, it can be understood that the number of the battery packs 42 can be set as required. The two or more battery packs 42 are arranged at horizontal intervals. The two or more battery packs 42 can be designed to be connected in parallel and then electrically connected to the drive assembly 20, so that the input current can be increased through powering by the two or more battery packs 42 connected in parallel, and more power can be gotten under a same voltage. The two or more battery packs 42 may also be designed to be connected in series and electrically connected to the drive assembly 20, so that the input voltage can be increased through powering by the two or more battery packs 42 connected in series, and obtain more power to adapt to battery packs of different voltages. Of course, the two or more battery packs 42 can also be designed to supply power to the drive assembly 20 individually and they are switchable, so that the two or more battery packs 42 can be automatically switched to cyclically provide power to the drive assembly 20. At this time, the electric vehicle 100 may also be provided with an indicator element (not shown) that indicates the power of the battery pack 42 to remind the user of the power of the battery pack. When the power of a certain battery pack is exhausted, the user can take out the battery pack and charge it. With this arrangement, the electric vehicle 100 can work uninterruptedly.

Figure 9:
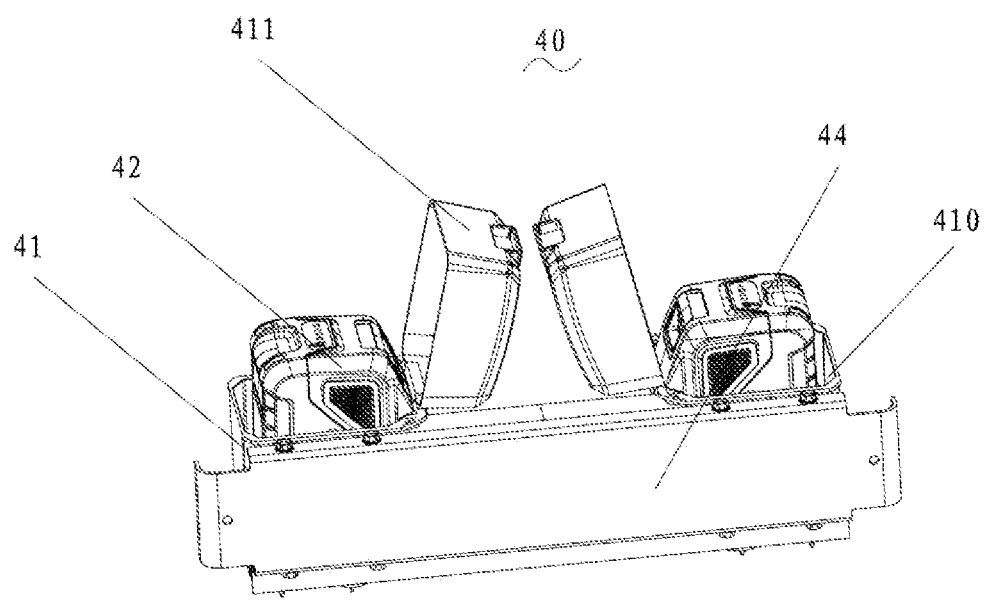
FIG. 9 is a schematic perspective view of a battery pack assembly shown in FIG. 1.
Figure 10:
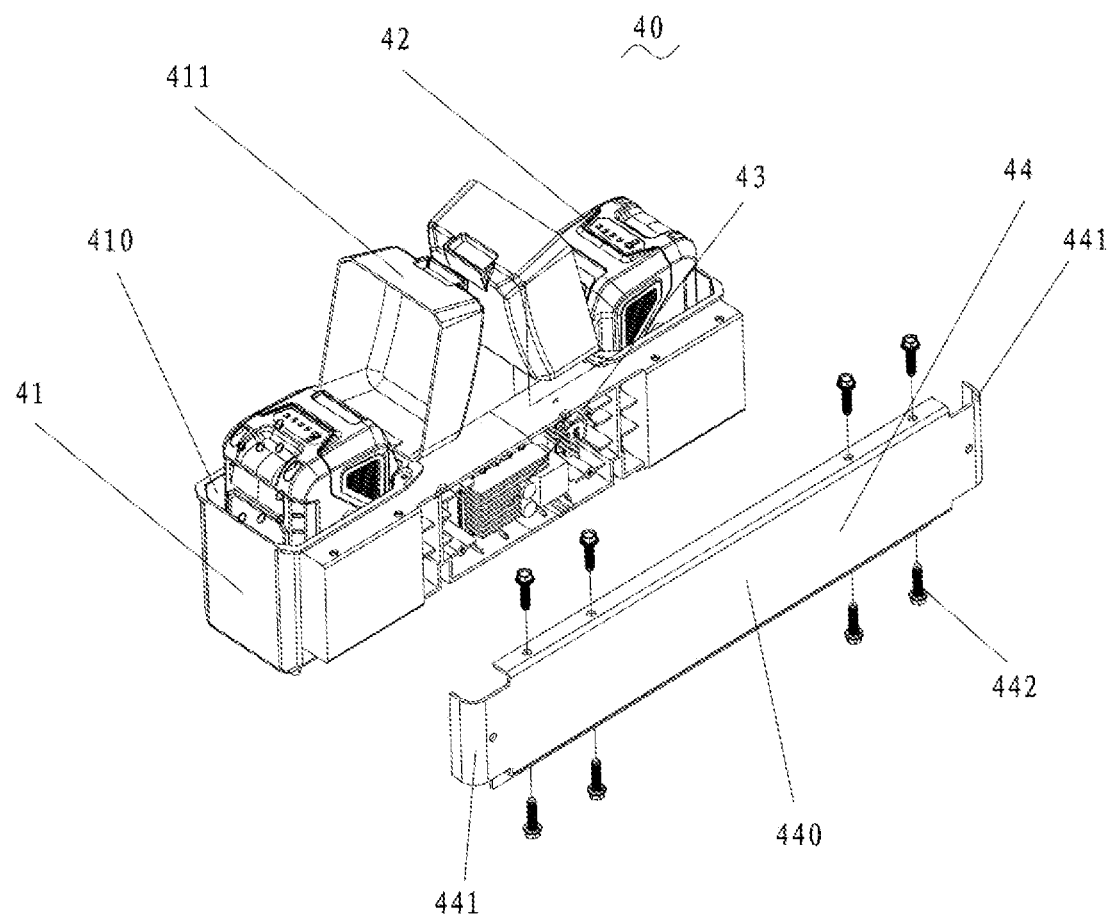
FIG. 10 is a partial exploded schematic view of the battery pack assembly shown in FIG. 9.
Figure 11:
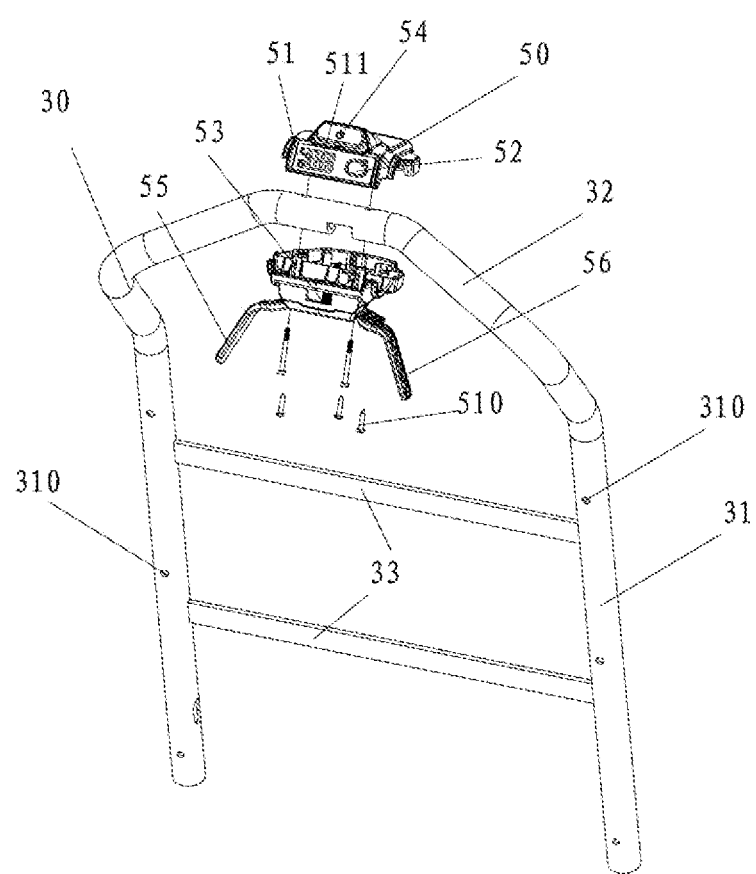
FIG. 11 is a partial exploded schematic view of a control assembly and an armrest frame of the electric vehicle shown in FIG. 1.
Figure 12:
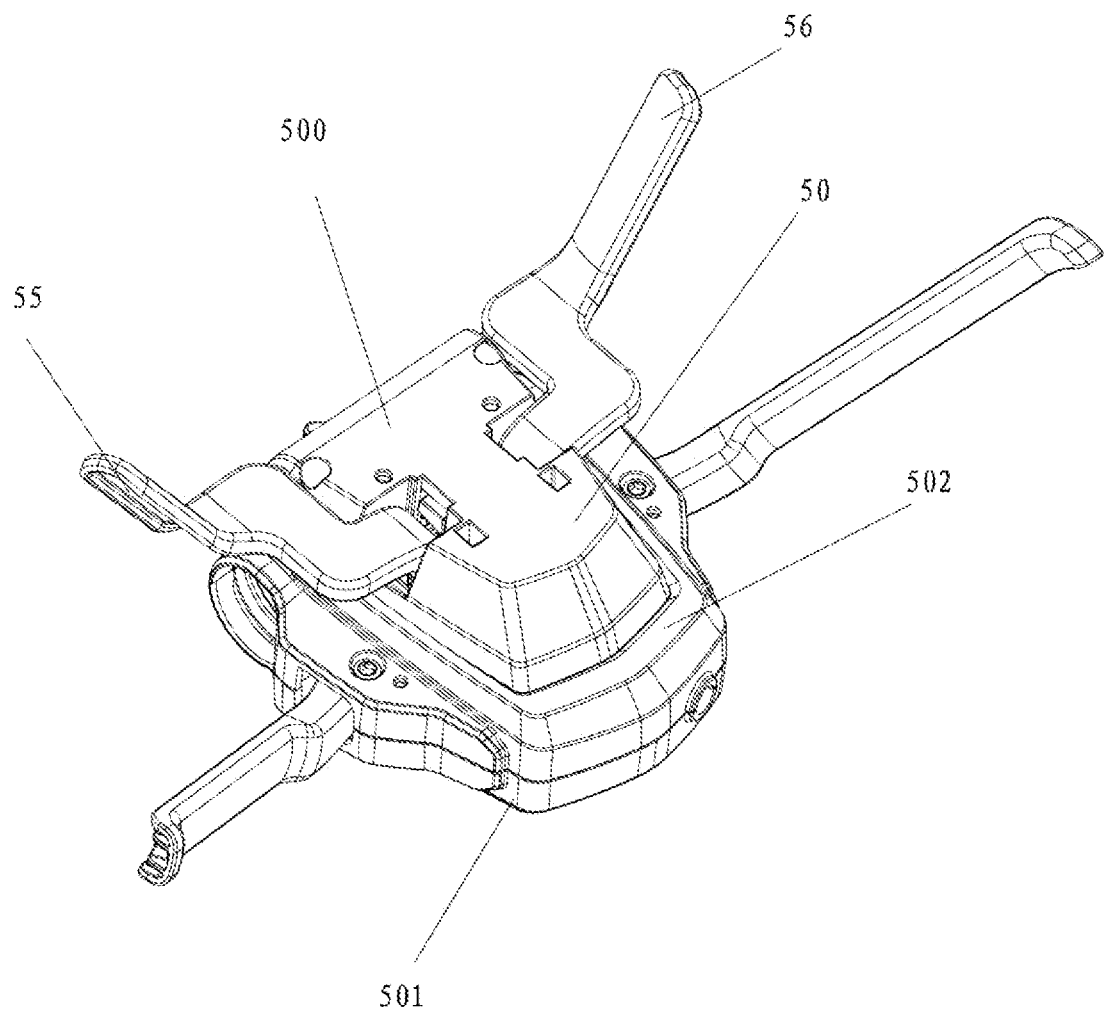
FIG. 12 is a first schematic perspective view of a control assembly of the electric vehicle shown in FIG. 1.

As shown in FIG. 9 and FIG. 10, the battery pack base 41 includes receiving cavities 410 for receiving the battery pack 42 and covers 411 that cooperates with the receiving cavities 410 to cover the corresponding battery pack 42. The two covers 411 can be opened to each other to expose the corresponding receiving cavities 410. The covers 411 and the corresponding receiving cavities 410 completely wrap the battery pack 42 to protect it from failure and short circuit when exposed to rain, thereby improving the safety and reliability of the battery pack 42. The battery pack 42 can be inserted into the corresponding receiving cavities 410 when working. The battery pack base 41 is also provided with a release button (not shown) and an elastic element (not shown) located in the receiving cavity 410. When the battery pack 42 is placed in the receiving cavity 410, and the release button is pressed, the battery pack 42 will be locked in the receiving cavity 410 through the buckle on the release button and the elastic element will be elastically deformed. When the battery pack 42 needs to be taken out, the release button can be pressed again to prevent the buckle from locking the battery pack 42. At this time, the elastic element will reset and push a part of the battery pack 42 up from the receiving cavity 410 so that the user can take out the battery pack 42 easily. The battery pack 42 can also be used by other power tools, for example: battery packs used in garden tools, in electric drills, etc., so that less battery packs need to be purchased and the cost can be reduced. At the same time, this configuration can also increase the usage rate of the battery pack 42. In addition, since the power supply assembly 40 and the armrest frame 30 are designed to be separate, it is convenient for designers to optimize the packaging size.

As shown in FIG. 9 and FIG. 10, the power supply assembly 40 further includes a bearing plate 44, and the battery pack base 41 is fixed on the bearing plate 44. The bearing plate 44 includes a plate-shaped part 440 cooperating with the battery pack base 41 and mating parts 441 set at two opposite ends of the plate-shaped part 440 to cooperate with the corresponding arm parts 31. The plate-shaped part 440 is arranged between the pair of arm parts 31 of the armrest frame 30, and the mating part 441 is provided with a fixing hole 4411 that matches with the mounting hole 310.

As shown in FIG. 10, the battery pack base 41 is fixedly connected to the bearing plate 44 by screws 442. The power supply assembly 40 is further provided with a safety key 45. When power supply assembly 40 is not used, the safety key 45 should be removed so that the electric vehicle 100 cannot be started. The power supply assembly 40 further includes a socket (not shown) to provide power for the drive assembly 20 in a pluggable manner.

As shown in FIG. 1 through FIG. 8, the battery pack base 41 is detachably installed on the armrest frame 30. The electric vehicle 100 also includes a pair of quick clip locks 70 to hold the battery pack base 41 on the armrest frame 30. The quick clip lock 70 includes a connecting rod 71 passing through the power supply assembly 40 and the mounting hole 310 on the arm parts 31, a knob 72 connected to one end of the connecting rod 71, a quick clip handle 73 pivotally mounted on the connecting rod 71, and a spacer block 74 arranged between the quick clip handle 73 and the corresponding arm parts 31. Since the arm parts 31 is provided with at least two mounting holes 310 along its length direction, the distance between each mounting hole 310 and the main body 10 is different, so that the user can adjust the mounting height of the power supply assembly 40 as needed. When in use, the power supply assembly 40 is placed on the armrest frame 30, and then the end of the connecting rod 71 away from the quick clip handle 73 are passed through the spacer block 74, the fixing hole 4411, and the mounting hole 310 in sequence, and then the knob 72 are installed on the connecting rod 71. Finally, the quick clip handle 73 is rotated so that an eccentric part 731 of the quick clip handle 73 abuts the spacer block 74 so that fixing the power supply assembly 40 can be fixed firmly. At the same time, the power supply assembly 40 is connected to the hub motor 21 of the drive assembly 20 of the electric vehicle 100 and the control assembly 50 through the socket. When not in use, the power supply assembly 40 can be disassembled for better storage and saving storage space.

As shown in FIG. 1 through FIG. 8, in order to adjust the installation height of the power supply assembly 40 easily, the arm parts 31 are provided with a plurality of mounting holes 310 along the extending direction of the arm parts 31. However, this structure still has inconveniences. When the installation height of the power supply assembly 40 need to be adjusted, the user needs to remove the quick clip lock 70, move the power supply assembly 40 up or down to another mounting hole 310, and then reinstall and fix the quick clip lock 70. This setting makes the operation relatively cumbersome. In order to simplify the step of adjusting the installation height of the power supply assembly 40, a stroke groove (not shown) is provided between adjacent mounting holes 310, so that the quick clip lock 70 can move from one mounting hole 310 to another mounting hole 310 through the stroke groove.

As shown in FIG. 1 through FIG. 8, the pair of quick clip locks 70 can selectively hold the power supply assembly 40 on one of the opposite sides of the armrest frame 30. At this time, the power supply assembly 40 is held on the outside of the armrest frame 30. The power supply assembly 40 maybe fixed on the inner side of the armrest frame 30, and the power supply assembly 40 can be fixed on the inner side of the armrest frame 30 at different heights. The quick clip handle 73 and the power supply assembly 40 are arranged on the same side of the opposite sides of the armrest frame 30, which means that when the power supply assembly 40 is arranged on the outer side of the armrest frame 30, the quick clip handle 73 is also arranged on the outer side of the armrest frame 30, and vice versa. The power supply assembly 40 is detachably installed at different positions of the armrest frame 30 so that the electric vehicle 100 has different loading spaces, and when the goods are placed, the electric vehicle 100 can be with the largest transportation capacity through replacing different positions of the power supply assembly 40.

As shown in FIG. 11 through FIG. 16, the control assembly 50 is installed in the middle of the cross-bar part 32. The control assembly 50 includes a fixing base 500. The fixing base 500 includes an upper fixing base 501 and a lower fixing base 502 that can be matched with the upper fixing base 501. In this embodiment, the control assembly 50 includes a control panel 51 which is installed on the fixing base 500 and close to the operator (the control panel 51 faces the operator, which is convenient for the operator to use), a forward and backward button 52 for controlling the moving direction of the electric vehicle 100, a speed-control knob 53 for adjusting the walking speed of the electric vehicle 100, a start button 54, a lower left operating handle 55, and a lower right operating handle 56. The control panel 51 is further provided with a walking-control switch (not shown), a main power-control switch (not shown), and a main motor-control switch (not shown). The control panel 51 is fixed on the armrest frame 30 by screws 510. The control panel 51 includes a power display area 511 to display the power of the power supply assembly 40. In this embodiment, the power display area 511 is an LED light group which is capable of displaying power, and the number of the LED light group corresponds to the number of the battery pack 42. Each LED lamp holder includes 4 LED lights to show the amount of power.

Figure 16:
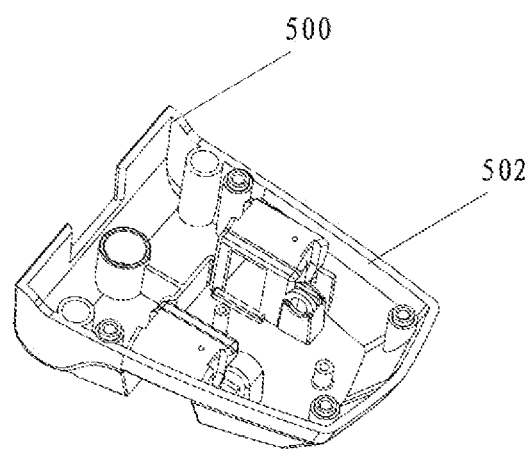
FIG. 16 is a schematic perspective view of the lower fixing base of the control assembly shown in FIG. 12 from another perspective.
Figure 17:
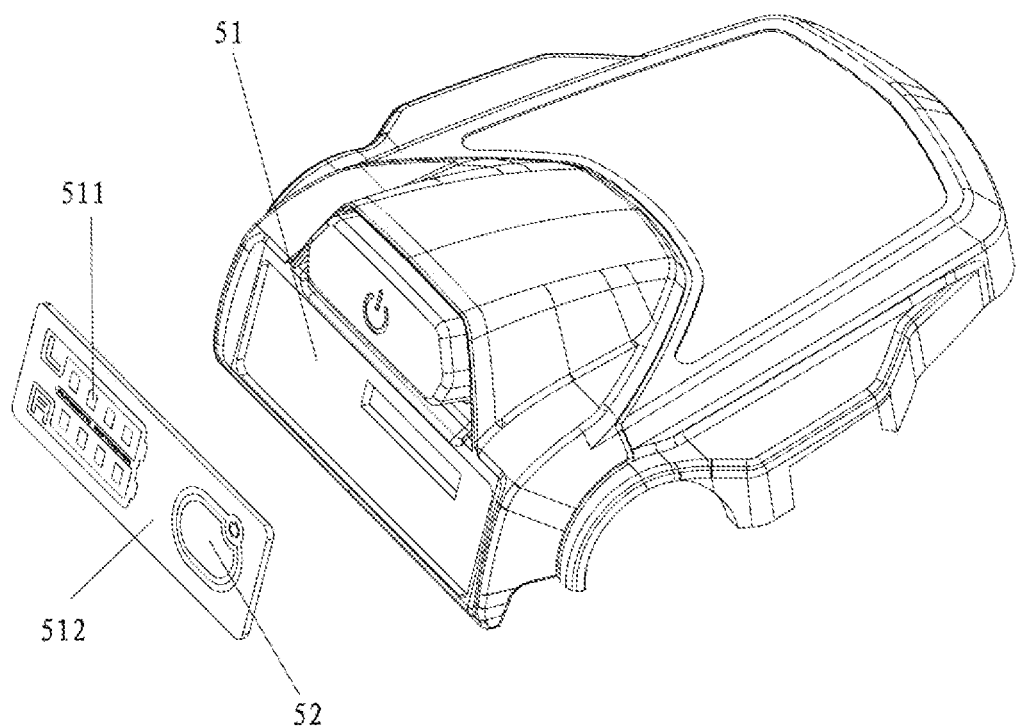
FIG. 17 is an exploded schematic view of a control panel and a membrane key assembly of an embodiment of the disclosure.

As shown in FIG. 16 through FIG. 17, the control panel 51 is also provided with a membrane key assembly 512. The membrane key assembly 512 is pasted on the side of the control panel 51 facing the operator through adhesive. In this embodiment, the power display area 511 and the forward and backward buttons 52 are integrated on the membrane key assembly 512. Of course, it can be understood that, in other embodiments, other buttons, such as the speed-control knob 53, can also be integrated on the membrane key assembly 512, which is not limited in the disclosure. The control panel 51 is fixed on the armrest frame 30 by screws 510, and a rubber sleeve (not shown) can be provided to penetrate the control panel 51 to increase the comfort and safety insulation when the control panel 51 is held. The start button 54 can trigger the main power-control switch. The lower left operating handle 55 and the lower right operating handle 56 can trigger the walking-control switch. The lower left operating handle 55 and the lower right operating handle 56 are pivotally mounted on the control assembly 50 through pivot shafts 551 and 561 respectively, so that the lower left operating handle 55 and the lower right operating handle 56 can be rotated around the pivot shafts 551 and 561. The axes of the pivot shafts 551 and 561 are substantially perpendicular to the plane where the cross-bar part 32 is located. Such a setting allows the user to move the lower left operation handle 55 or the lower right operation handle 56 with the thumb, and make the lower left operation handle 55 or the lower right operation handle 56 fit the cross-bar part 32 to trigger the walking-control switch, which complies with ergonomics and also improves the comfort when used.

Figure 18:
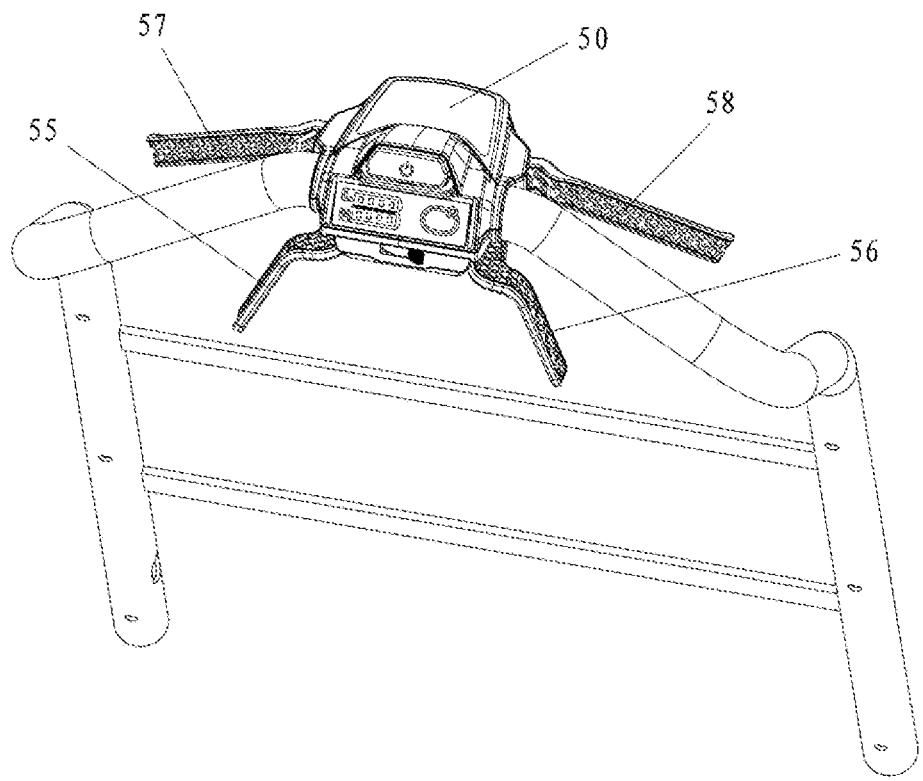
FIG. 18 is a schematic perspective view of a coordination of a control assembly and a armrest frame from another perspective of an embodiment of the disclosure.
Figure 19:
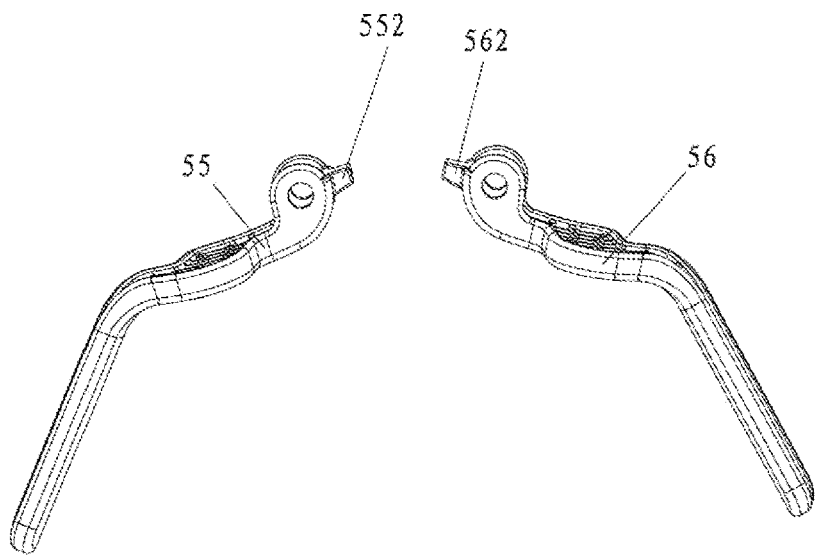
FIG. 19 is a schematic perspective view of a lower left operating handle and a lower right operating handle of an embodiment of the disclosure.

As shown in FIG. 18 and FIG. 19, the lower left operating handle 55 and the lower right operating handle 56 are respectively provided with resisting arms 552, 562 that cooperate with the walking-control switch, and the resisting arms 552, 562 resist a lever (not shown) and then trigger the walking-control switch through the lever. The control assembly 50 is also provided with a left brake handle 57 and a right brake handle 58 to realize the disc brake or hub brake function, which means when the electric vehicle 100 is moving, the electric vehicle 100 can be decelerated through the left brake handle 57 or the right brake handle 58, so that the electric vehicle 100 can be stopped. The lower left operating handle 55 and the lower right operating handle 56 are arranged below or directly below the cross-bar part 32, and the left brake handle 57 and the right brake handle 58 are arranged in front or directly in front of the cross-bar part 32. Of course, it can be understood that in other embodiments, the positions of the lower left operating handle 55 and the lower right operating handle 56, and the positions of the left brake handle 57 and the right brake handle 58 can be interchanged.

Figure 13:
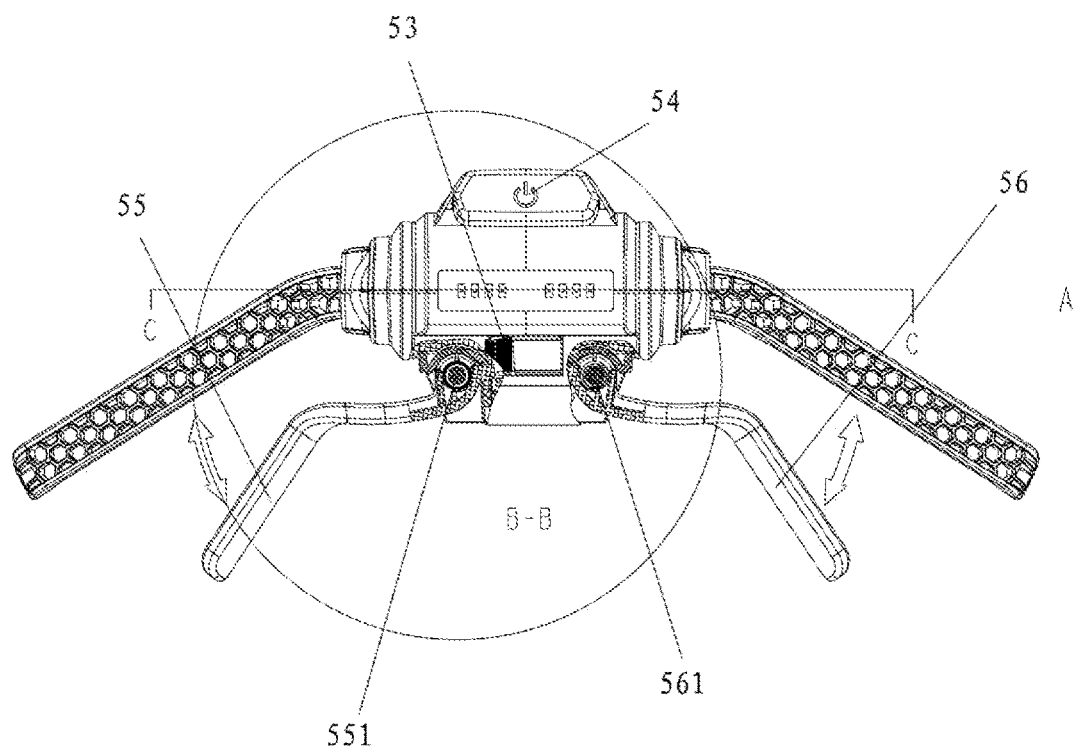
FIG. 13 is a second schematic perspective view of the control assembly of the electric vehicle shown in FIG. 12 from another perspective.
Figure 14:
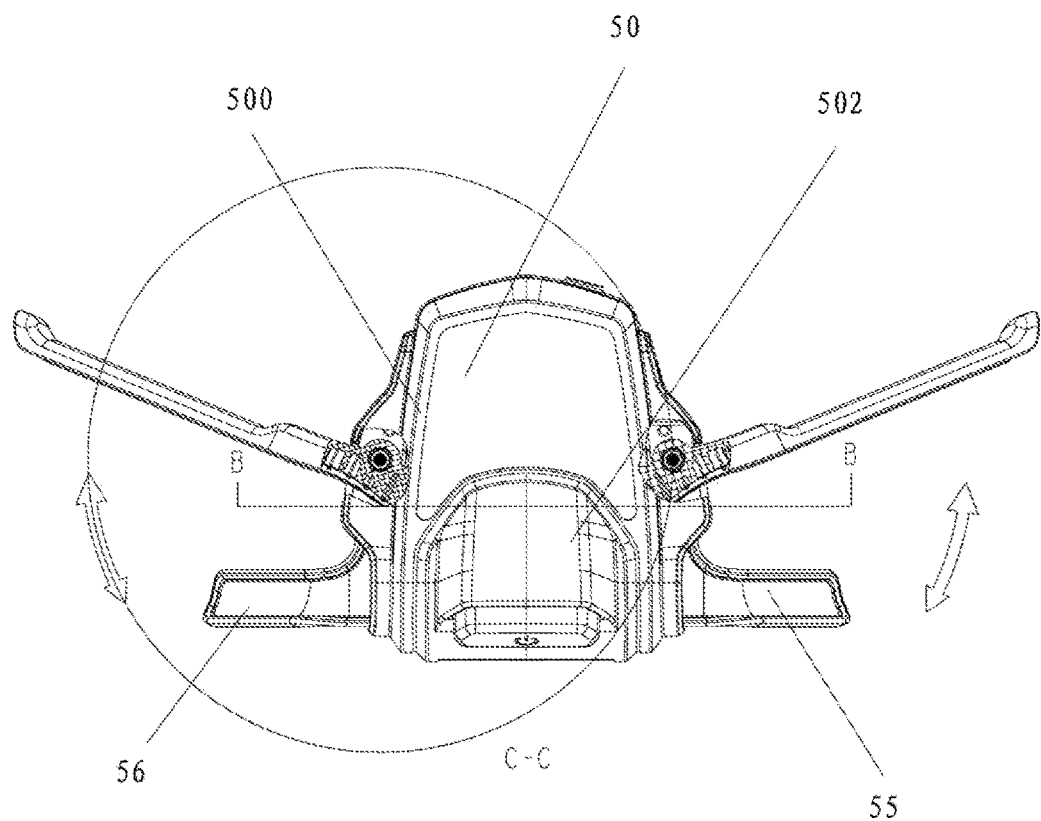
FIG. 14 is a third schematic perspective view of the control assembly of the electric vehicle shown in FIG. 12 from another perspective.
Figure 15:
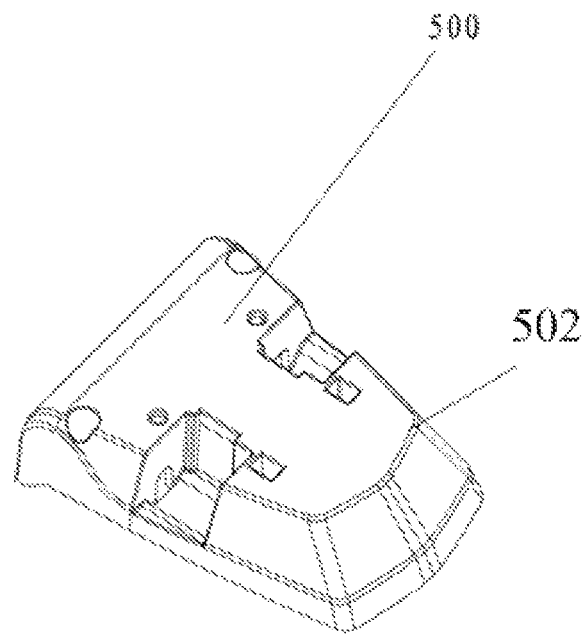
FIG. 15 is a schematic perspective view of a lower fixing base of the control assembly shown in FIG. 12.

As shown in FIG. 13, when the electric vehicle 100 needs to be self-moved, the operator first presses the start button 54 so that it triggers the main power-control switch to activate the electric vehicle 100, and then the lower left operating handle 55 and/or the lower right operating handle 56 are pulled to trigger the main motor-control switch (not shown). At this time, the drive assembly 20 is started to make the electric vehicle 100 self-move and pull the goods, the start button 54 can be released. When the moving direction of the electric vehicle needs to be changed, the forward and backward buttons 52 (shown in FIG. 17) can be pressed to change the moving direction of the electric vehicle 100. For example, when the electric vehicle 100 is moving forward and the forward and backward buttons 52 is pressed, the running direction of the electric vehicle 100 is changed from the forward to the backward. When the forward and backward button 52 is pressed again, the electric vehicle 100 will change to the forward again. When the operator releases the lower left operating handle 55 and the lower right operating handle 56, the drive assembly 20 can be stopped and the electric vehicle 100 will stop moving. Of course, the operator can also first pull any one of the lower left operation handle 55 and the lower right operation handle 56 and then press the start button 54 to start the drive assembly 20.

As shown in FIG. 13, the speed control knob 53 toggle the potentiometer through gears. The speed control knob 53 can control the moving speed of the electric vehicle 100. When the electric vehicle 100 is controlled to be self-moved, the speed control knob 53 can be dialed to adjust the moving speed of the hub motor 21, so that the moving speed of the electric vehicle 100 can be adjusted.

As shown in FIG. 13, the control panel 51 may also be provided with a brake, which is controlled by the lower left operating handle 55 and the lower right operating handle 56 to brake and stop the hub motor. When the electric vehicle 100 is in a stopped state, the brake can prevent the electric vehicle 100 from moving by itself. Therefore, the working process of the brake is different from that of the left brake handle 57 and the right brake handle 58. When the operator releases the lower left operating handle 55 and the lower right operating handle 56, the electric vehicle 100 can activate the brake at a set time. When the operator presses the start button 54 again, the brake will be invalid. This prevents the electric vehicle 100 from moving by itself when the ground is not flat. The brake is an electronic brake, which is controlled by software. When the lower left operating handle 55 and the lower right operating handle 56 are released, the brake of the electric vehicle 100 will be activated within 1 second. When the start button 54 is pressed, the brake function is invalid. The electric vehicle 100 can be pushed by hand, or the start button 54 and the lower left operating handle 55 or the lower right operating handle 56 can be pressed at the same time to start the main motor of the electric vehicle 100, and the start button 54 is released simultaneously, the electric vehicle 100 can move and pull goods.

In summary, since the power supply assembly 40 of the electric vehicle 100 of the disclosure is fixedly installed on the armrest frame 30, it is convenient for the user to replace the battery pack to realize the uninterrupted work of the electric vehicle 100, so that the problem of insufficient battery life of the existing electric vehicles is solved.

Figure 20:
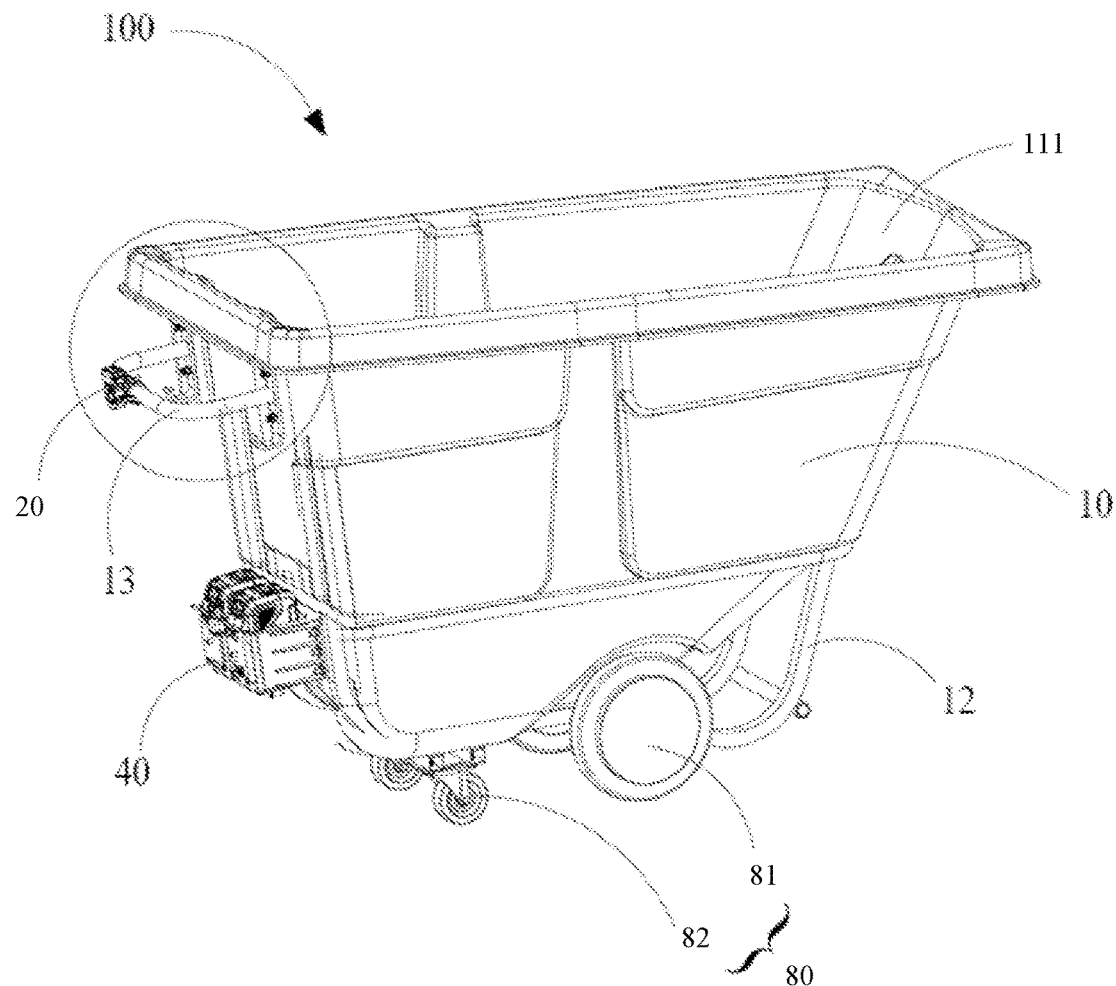
FIG. 20 is a third schematic perspective view of the electric vehicle of the disclosure.
Figure 21:
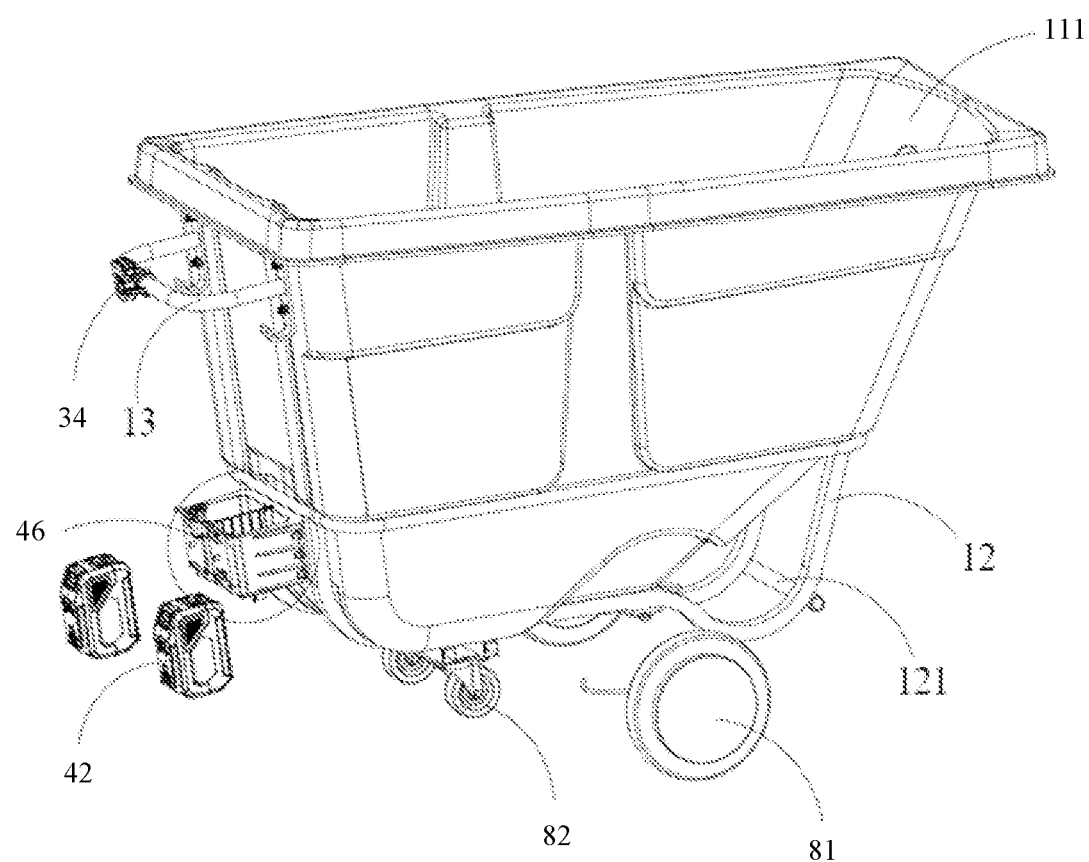
FIG. 21 is an exploded schematic view of the electric vehicle of the disclosure.
Figure 22:
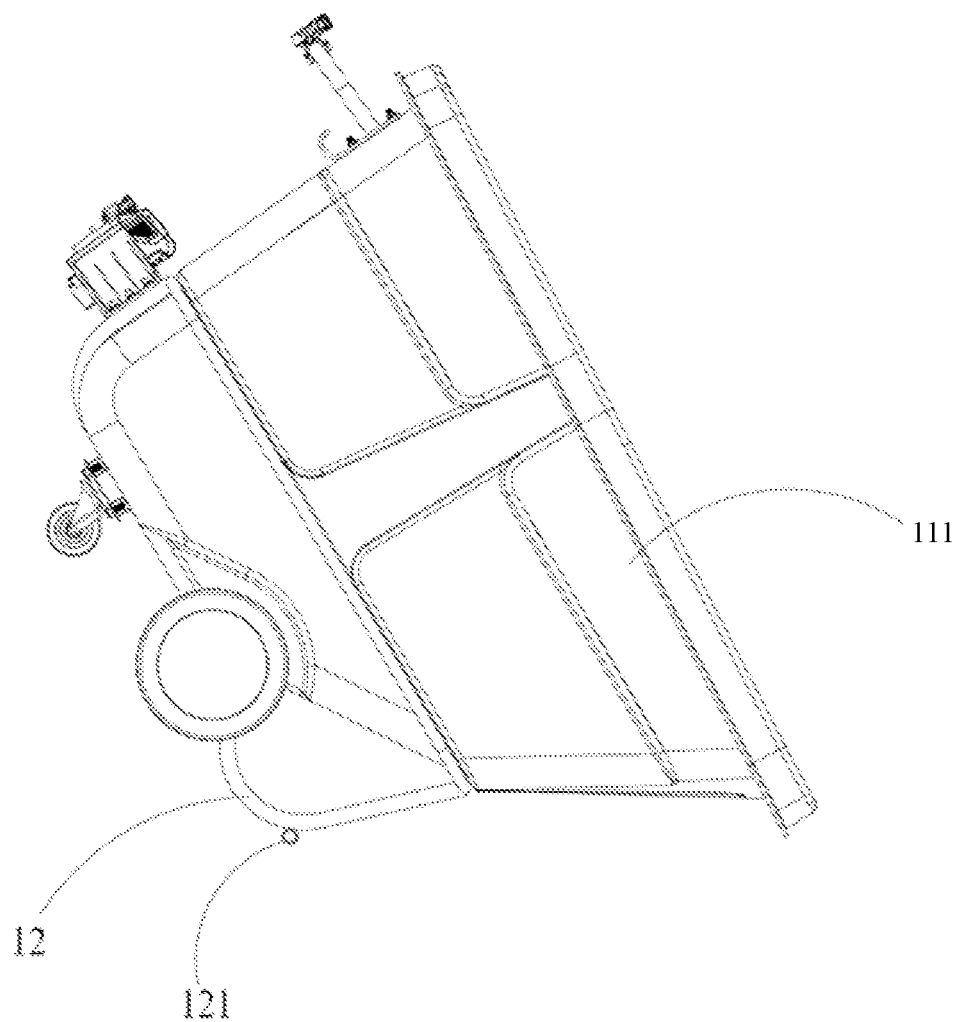
FIG. 22 is a schematic view of a raised state of the electric vehicle of the disclosure.
Figure 23:
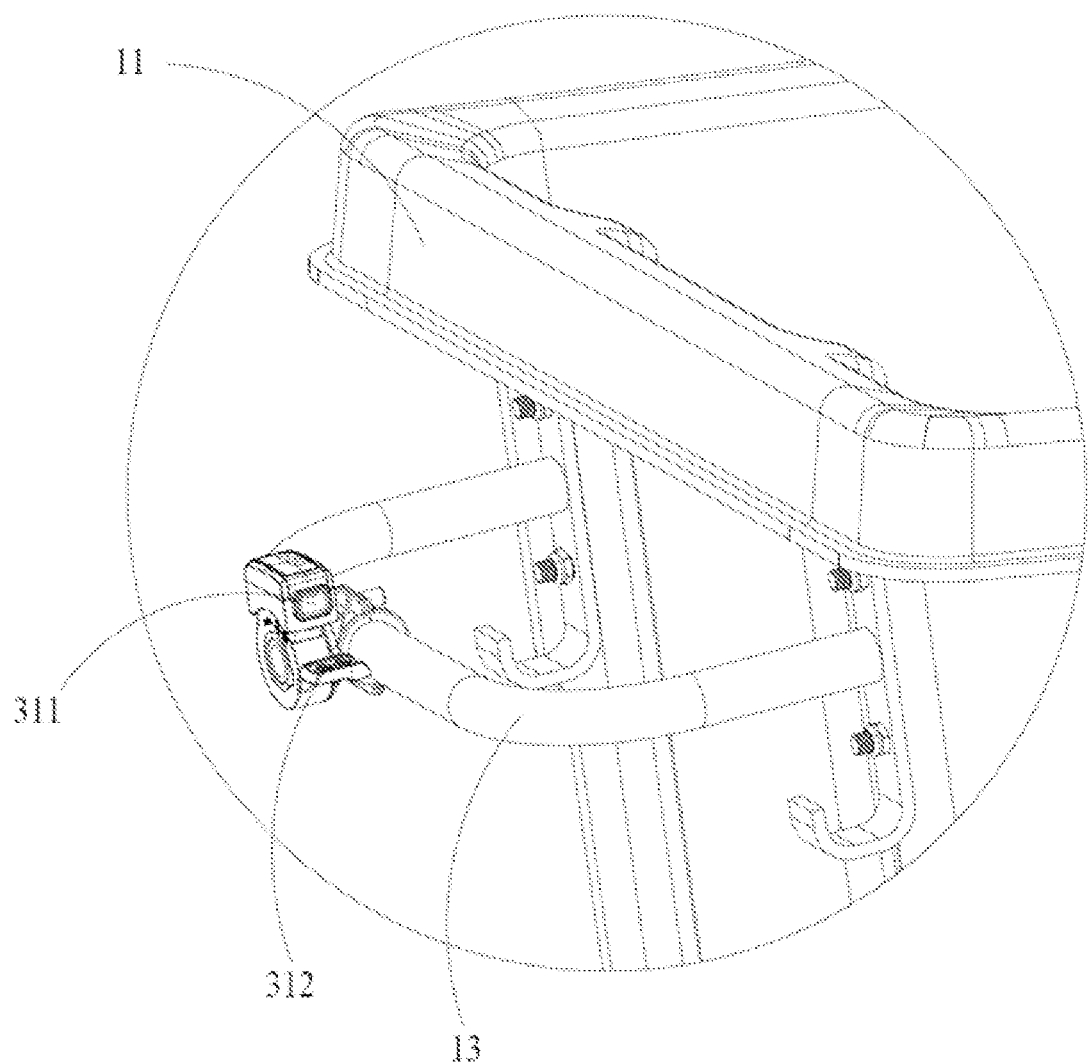
FIG. 23 is a partial enlarged schematic view of FIG. 20.

As shown in FIG. 20 through FIG. 21, the disclosure also provides an electric vehicle 100, which includes a main body 10, traveling wheels 80 arranged on the main body 10, a driving assembly 20 and a power supply assembly 40.

As shown in FIG. 20 through FIG. 21, the main body 10 includes a body 111, a frame 12 arranged below the body 111, and a handle 13 arranged at the rear of the body 111. The body 111 is, for example, a vehicle body. The body 111 is a long and narrow rectangle, and the upper part of the car body 111 is provided with an opening and the upper part of the opening is larger and the lower part is smaller, which is convenient for loading and unloading goods. The handle 13 is a U-shaped handle, and both ends of the U-shaped handle are fixed on the body 111. The frame 12 is arranged along the bottom of the body 111, and the front end of the frame 12 is also provided with a cross beam 121. Please refer to FIG. 3, when the electric vehicle 100 is lifted from the back to the front, the cross beam 121 is in contact with the ground and make the frame 12 stronger.

As shown in FIG. 20 and FIG. 21, the traveling wheels 80 include driving wheels 81 and supporting wheels 82. The driving wheels 81 are arranged at the rear of the main body 10, and the supporting wheels 82 are arranged at the front of the main body 10. Specifically, the driving wheels 81 and the supporting wheels 82 are arranged on the frame 12. The driving wheels 81 are provided with hub motors. The driving wheels 81 are two and arranged side by side, and each driving wheel 81 is provided with a hub motor. There are also two supporting wheels 82, and the supporting wheels 82 are, for example, universal wheels to facilitate the rotation of the electric vehicle 100. In other embodiments, according to the actual load requirements of the vehicle, all or some of the traveling wheels can be selectively provided with hub motors.

As shown in FIG. 20 through FIG. 23, the driving assembly 20 is used to control the traveling wheels 80. The driving assembly 20 includes a hub motor and a controller 34 for controlling the hub motor. The hub motor is arranged on the traveling wheel 80. The controller 34 includes a switch button 311 for controlling the start and stop of the hub motor. On one side of the switch button 311 is also provided with a speed-control handle 312 for controlling the rotation speed of the hub motor. The controller 34 is arranged on the handle 13, which is convenient for controlling the speed of the electric vehicle 100 at any time. The controller 34 is, for example, sleeved on the handle 13, and the controller 34 can also move along the handle 13. When the controller 34 is moved to a suitable position, it can be fixed. The controller 34 also rotates along the central axis of the handle 13, so that the controller 34 can be placed in a suitable position for the convenience of the operator.

As shown in FIG. 21, the power supply assembly 40 is used to provide power for the drive assembly 20, and the power supply assembly 40 is arranged at the rear part of the main body 10. As can be understood, the rear part may be a rear/rear side of the main body 10 or a rear part including a part of the bottom. Specifically, the power supply assembly 40 includes a battery pack 42, a battery pack accommodating part 46, and a fixing part 47 for assembling the battery pack accommodating part 46 on the main body 10. The number of battery pack 42 is two.

Figure 24:
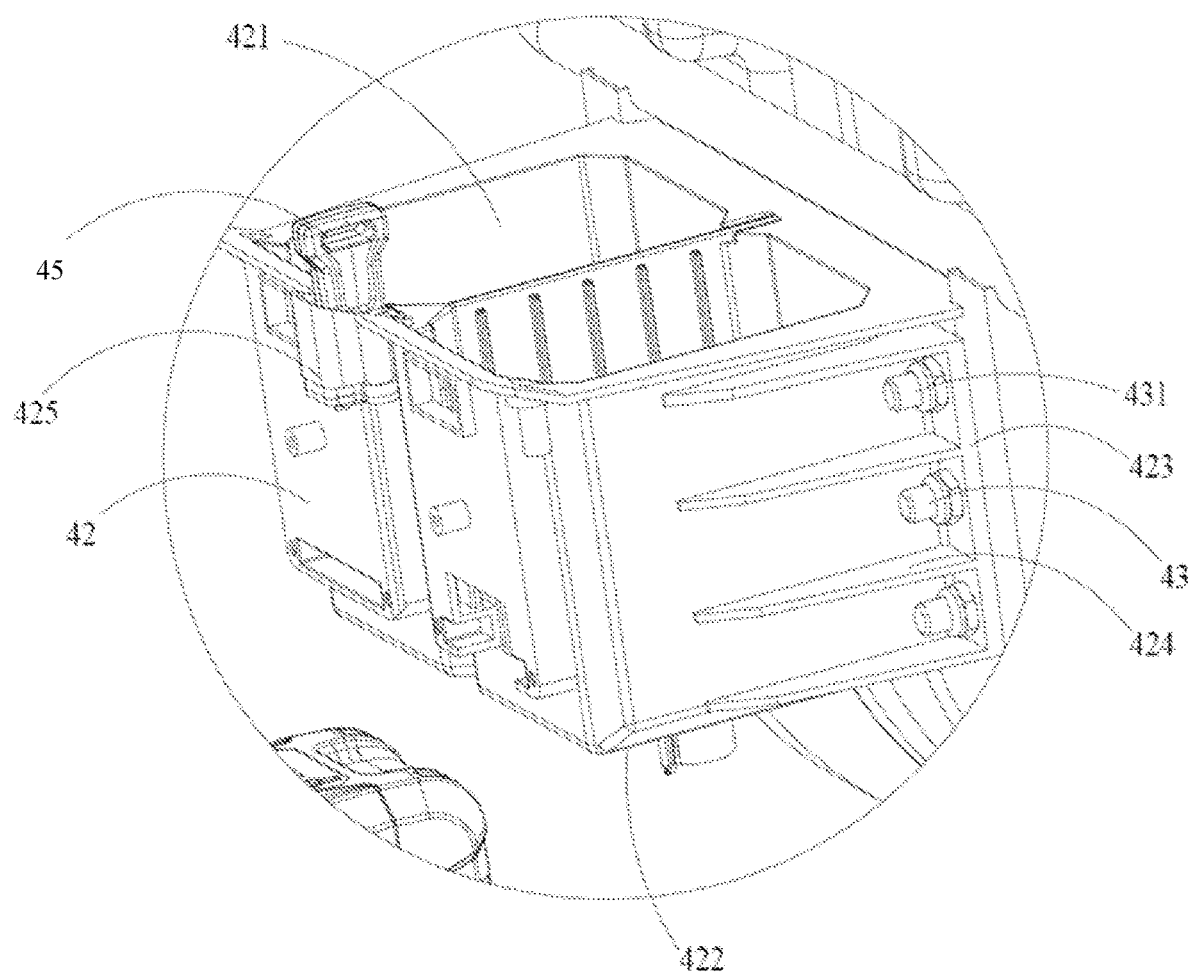
FIG. 24 is a partial enlarged schematic view of FIG. 21.

As shown in FIG. 24, the battery pack accommodating part 46 is fixed at the rear of the body 111, specifically located below the handle 13. The distance between the handle 13 and the body 111 is greater than the thickness of the battery pack accommodating part 46, so that when the electric vehicle 100 is pushed or lifted and the center of gravity of the body is stable, it is not easy to tip over, and convenient to operate. The top of the battery pack accommodating part 46 is open, and the battery pack 42 is assembled to the battery pack accommodating part 46 from the opening. The battery pack accommodating part 46 includes a side wall 421 and a bottom wall 422 connected to the side wall 421. The fixing part 47 includes two mounting plates 423 extending from the side wall 421 to both sides and a fastener 431. The fastener 431 passes through the mounting plates 423 and fix the mounting plates 423 on the main body 10, which means, on the body 111. The fastener 431 can be a bolt. One or more reinforcing ribs 424 are provided between the mounting plate 423 and the side wall 421 to strengthen the mounting plate 423.

As shown in FIG. 24, the opening of the battery pack accommodating part 46 is provided with a key holder 425, and the key holder 425 is provided with a pluggable safety key 45. The safety key 45 is used to control the conduction or disconnection of the battery pack 42. For example, the conduction or disconnection of the battery pack can be realized through rotating the safety key 45.

In summary, in the embodiment of the electric vehicle of the disclosure, the power supply assembly is arranged at the rear of the main body of the electric vehicle, and the opening of the battery pack accommodating part is arranged upward, which facilitates the installation and disassembly of the battery pack and improve work efficiency. In addition, a hub motor is set on the traveling wheels to drive the vehicle instead of manual push, which can greatly save the time of goods transportation, and it is very labor-saving. It also can effectively avoid the overturning when going uphill. In addition, the design of the hub motor makes the overall structure of the electric vehicle simple, easy to operate, labor-saving, and practical. Furthermore, the controller is arranged on the handle of the electric vehicle, which is convenient to control the start and stop of the electric vehicle and adjust the moving speed at any time.

Figure 25:
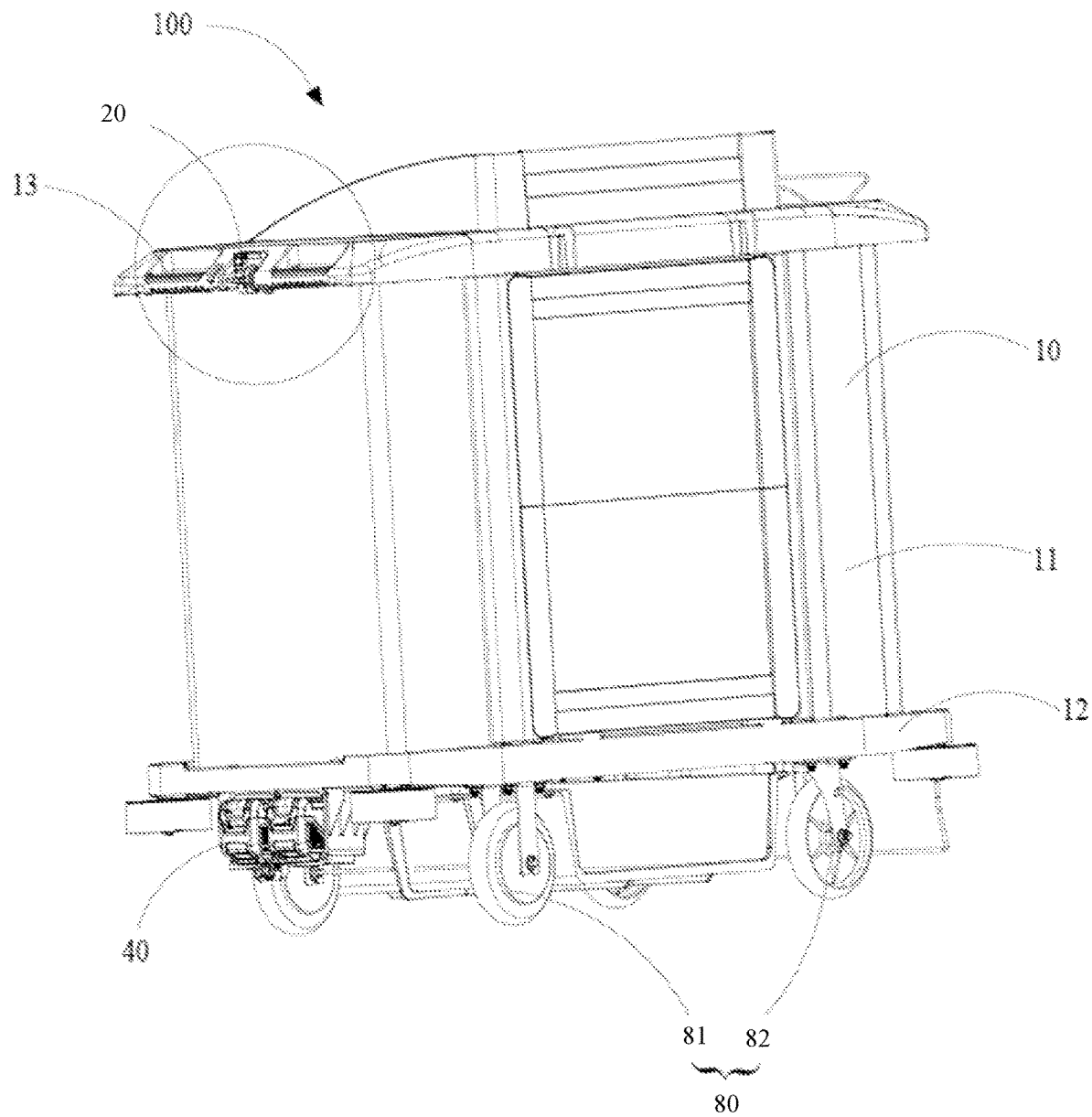
FIG. 25 is a fourth schematic perspective view of the electric vehicle of the disclosure.

As shown in FIG. 25, the disclosure further provides an electric vehicle 100, which includes a main body 10, traveling wheels 80 arranged on the main body 10, a driving assembly 20 and a power supply assembly 40.

Figure 26:
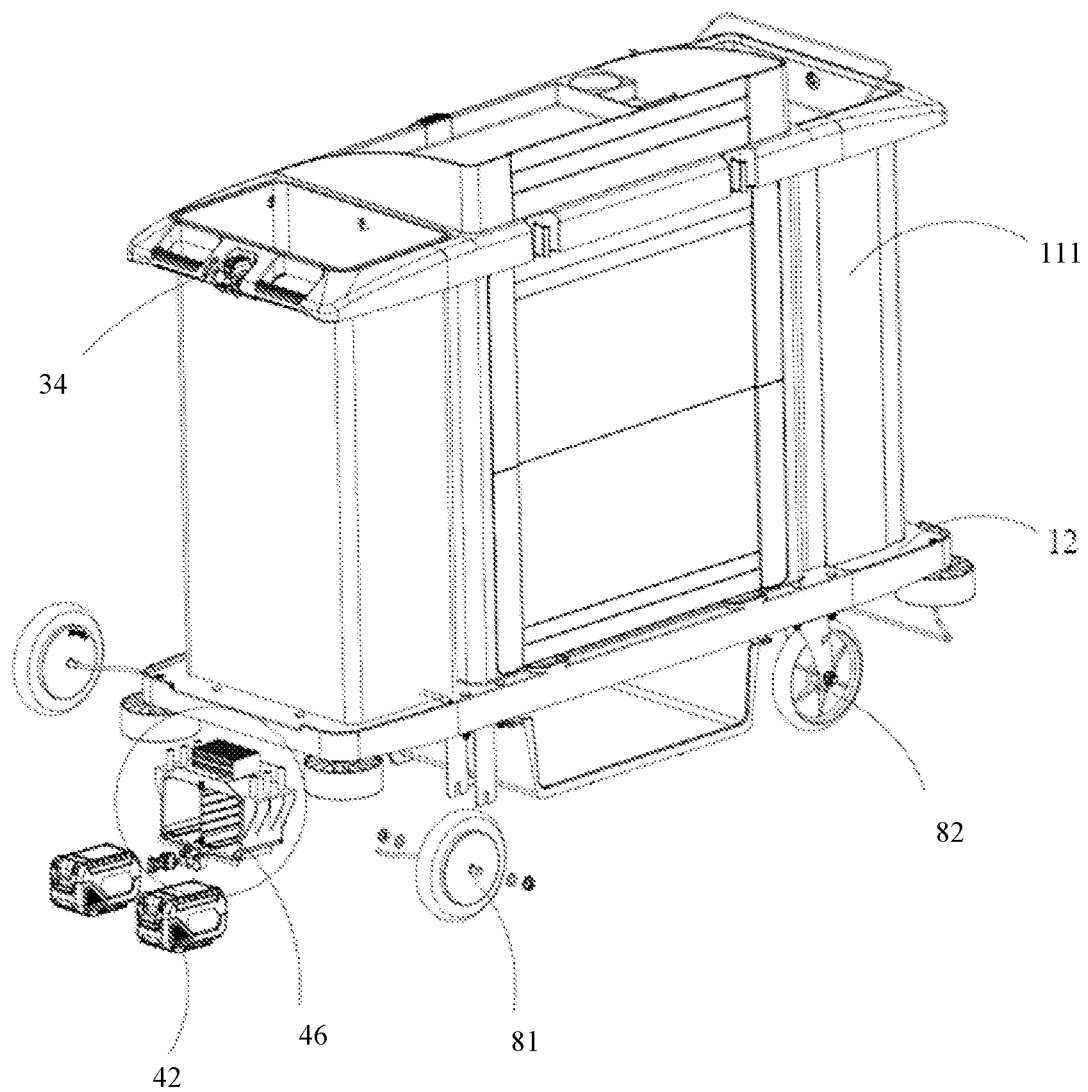
FIG. 26 is an exploded schematic view of the electric vehicle of the disclosure.
Figure 27:
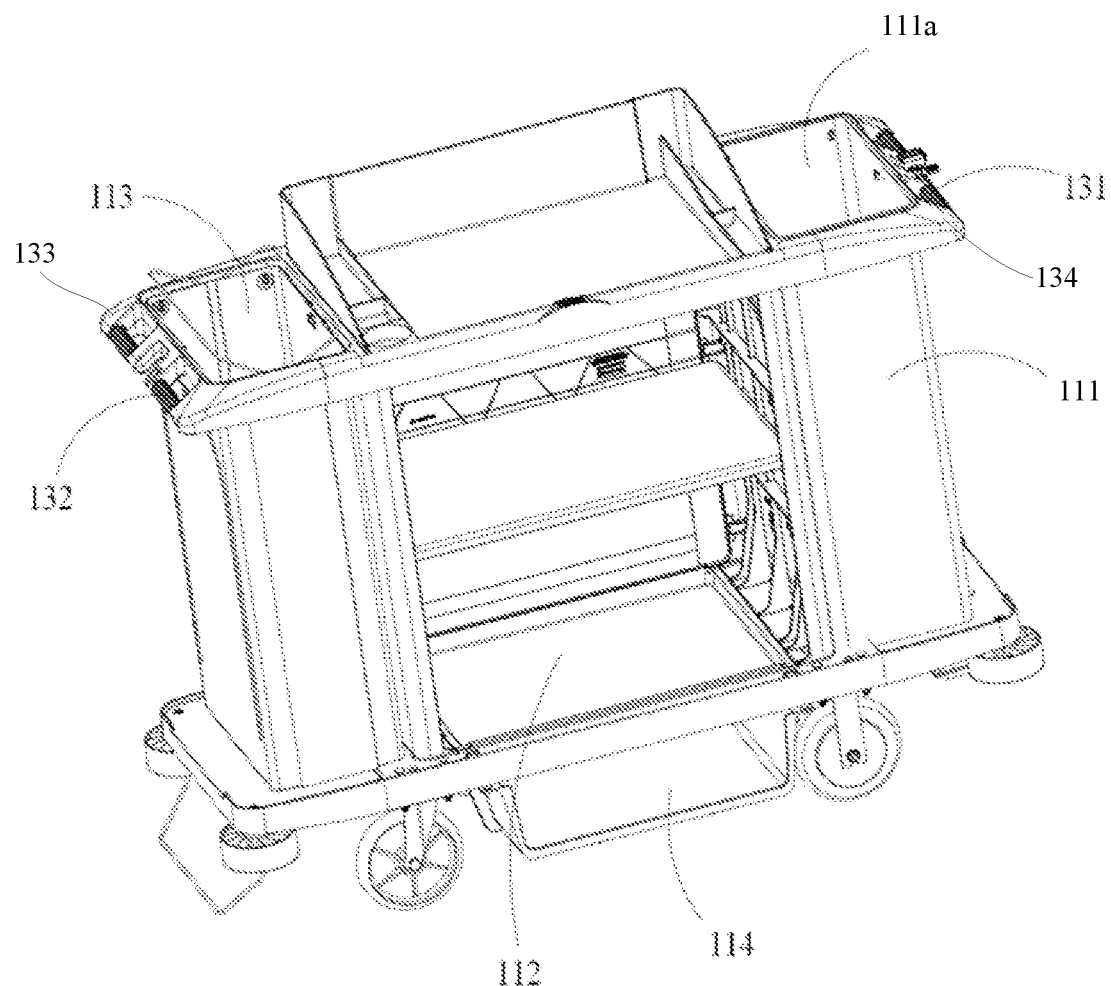
FIG. 27 is a fifth schematic perspective view of the electric vehicle of the disclosure from another direction.

As shown in FIG. 25 through FIG. 27, the main body 10 includes a body 111, a frame 12 arranged below the body 111, and a handle 13 arranged at the rear of the body 111. The body 111 is, for example, a cabin. The body 111 is roughly a cuboid. A plurality of storage spaces are arranged in the body 111. The body 111 includes a first space 111a, a second space 112, and a third space 113 that are sequentially arranged from front to back. The first and third spaces open upward, and the second space 112 opens to one side. The frame 12 is a flat-plate shaped and is arranged substantially parallel to the ground. There is also a fourth space 114 which opens on one side in the middle of the lower part of the body 111, which is convenient for sorting, placing and fetching goods.

Figure 28:
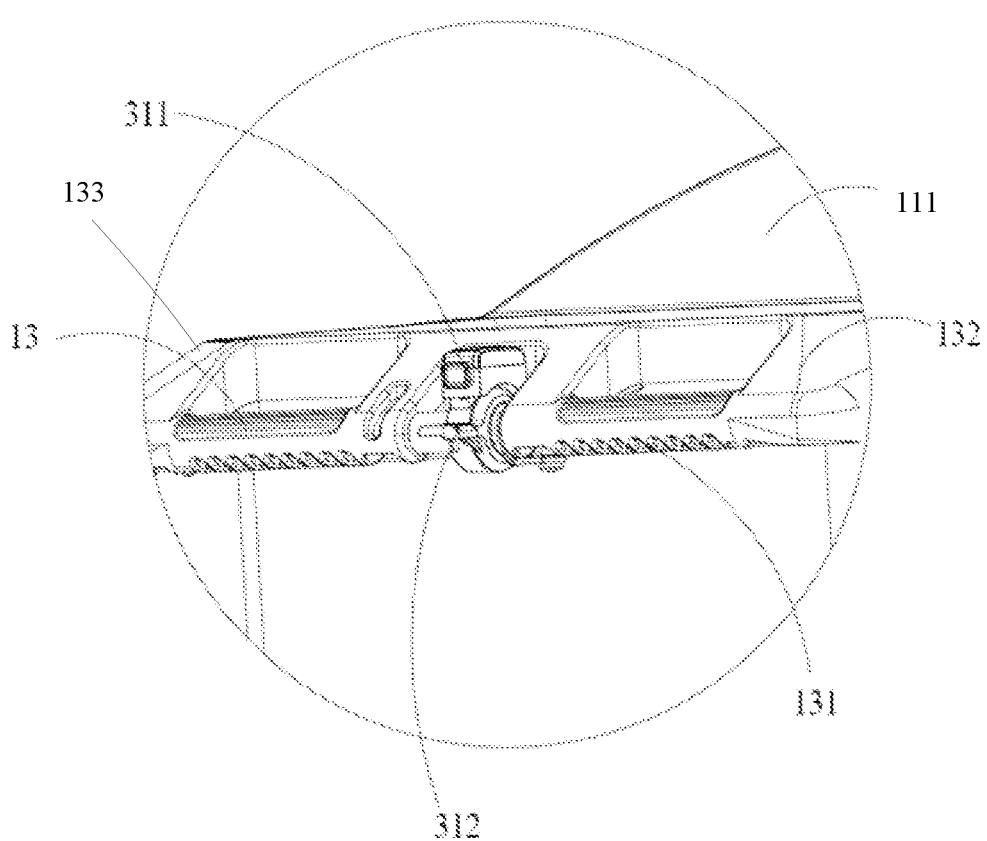
FIG. 28 is a partial enlarged schematic view of FIG. 25.

As shown in FIG. 27 and FIG. 28, the handle 13 includes a first handle 133 located at the rear and upper of the body 111 and a second handle 134 located at the front and upper of the body 111. This arrangement makes it convenient to push the electric vehicle 100 from front or rear. The handle 13 is integrally formed with the body 111. Each handle 13 includes a holding part 131 arranged along the width direction of the body 111 and a connecting part 132 connecting the holding part 131 and the body 111.

As shown in FIG. 25 through FIG. 28, the drive assembly 20 is used to control the traveling wheels 80 to move. The drive assembly 20 includes a hub motor arranged on the traveling wheels 80. The controller 34 is used to control the hub motor. The traveling wheels 80 include driving wheels 81 and supporting wheels 82. Specifically, the hub motor is arranged on the driving wheels 81. The driving wheels 81 are arranged at the rear of the main body 10, and the supporting wheels 82 are arranged at the front of the main body 10. Specifically, the driving wheels 81 and the supporting wheels 82 are arranged on the frame 12. There are two driving wheels 81 and they are arranged side by side. There are also two supporting wheels 82, and they can be universal wheels to facilitate the rotation of the electric vehicle 100. In other embodiments, according to the actual load requirements of the electric vehicle, all or some of the traveling wheels can be selectively provided with hub motors.

As shown in FIG. 27 and FIG. 28, the controller 34 includes a switch button 311 for controlling the start and stop of the hub motor and a speed-control handle 312 for controlling the rotation speed of the hub motor. The controller 34 is arranged on the first handle 133 or the second handle 134 to facilitate the control of the speed of the electric vehicle 100 at any time. In the disclosure, the controller 34 is arranged on the first handle 133. With this arrangement, the distance between the controller 34, and the battery pack 42 and the hub motor is closer. The structure is compact, and the installation is convenient.

Figure 29:
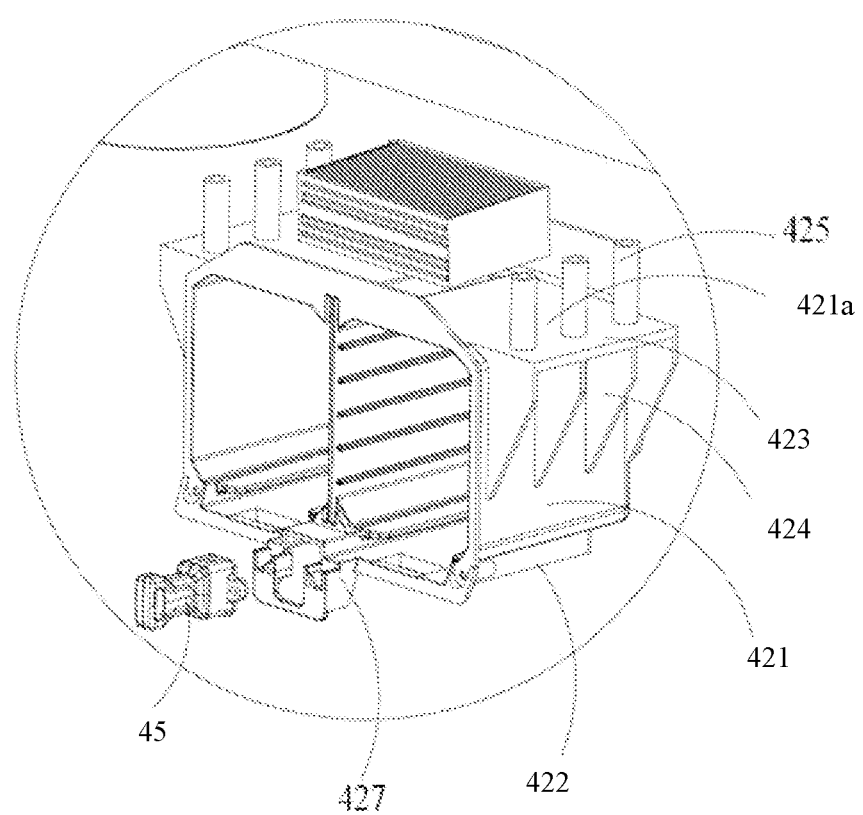
FIG. 29 is a partial enlarged schematic view of FIG. 26.

As shown in FIG. 29, the power supply assembly 40 is used to provide power for the drive assembly 20, and the power supply assembly 40 is arranged at the bottom of the main body 10 and is arranged close to the rear end of the main body 10. Specifically, the power supply assembly 40 includes a battery pack 42, a battery pack accommodating part 46, and a fixing part 47 for assembling the battery pack accommodating part 46 on the main body 10. The number of battery pack 42 is two.

As shown in FIG. 26 through FIG. 29, the battery pack accommodating part 46 is fixed at the bottom and rear of the frame 12. The battery pack accommodating part 46 is open at the rear, and the battery pack 42 is assembled to the battery pack accommodating part 46 from the opening from top to bottom. The opening of the battery pack accommodating part 46 is flush with the rear edge of the frame 12, and this arrangement facilitates the installation and disassembly of the battery pack 42. The battery pack accommodating part 46 does not protrude from the frame 12 and does not occupy additional space. The electric vehicle 100 has a compact structure. In other embodiments, the battery pack accommodating part 46 may also be arranged at the bottom of the front end of the main body 10. In this case, the battery pack accommodating part 46 needs to be set as a front opening to facilitate the installation and disassembly of the battery pack.

As shown in FIG. 29, the battery pack accommodating part 46 includes a side wall 421, a top wall 421a and a bottom wall 422 connected to the side wall 421. The fixing part includes a mounting plate 423 extending from the top wall 421a to both sides, a mounting post 425 arranged above the mounting plate 423 and bolts. The bolts pass through the mounting post 425 and fix the mounting plate 423 on the main body 10, which means, on the body 111. A number of reinforcing ribs 424 are arranged between the mounting plate 423 and the side wall 421 in order to strengthen the mounting plate 423.

As shown in FIG. 29, a safety lock 427 and a safety key 45 are provided at the opening of the battery pack accommodating part 46. The safety lock 427 and the safety key 45 cooperate with each other to control the conduction and disconnection of the battery pack 42.

In summary, in the electric vehicle of the disclosure, the power supply assembly is arranged at the bottom of the main body, and the opening of the battery pack accommodating part is arranged backward, which facilitates the installation and disassembly of the battery pack, and improves work efficiency. In addition, setting a hub motor on the traveling wheels to drive the electric vehicle instead of manual push can greatly save the time of transporting goods, and it is very labor-saving to use. The design of the hub motor makes the overall structure of the electric vehicle simple, easy to operate, labor-saving, and practical. The controller is arranged on the handle of the electric vehicle, which is convenient to control the start and stop of the electric vehicle and adjust the moving speed at any time.

The above description is only a preferred embodiment of the application and an explanation of the technical principles used. Those skilled in the art should understand that the scope of the disclosure involved in this application is not limited to a technical solution formed by a specific combination of the above technical features. At the same time, it should also cover other technical solutions formed by any combination of the above technical features or their equivalent features without departing from the disclosure concept. For example, the above-mentioned features and the technical features disclosed in this application (but not limited to) with similar functions are mutually replaced to form a technical solution.

Except for the technical features described in the specification, the remaining technical features are known to those skilled in the art. In order to highlight the innovative features of the disclosure, the rest of the technical features will not be repeated here.

What is claimed is:

1. An electric vehicle comprising:
   a main body;
   traveling wheels, arranged on the main body;
   a drive assembly, arranged on the main body, wherein the drive assembly includes a hub motor which is arranged on the traveling wheels;
   a controller, used to control the hub motor; and
   a control assembly comprising
      a start button,
      a lower left operation handle, and
      a lower right operation handle;
   when the lower left operation handle and the lower right operation handle are released, a braking structure of the electric vehicle will be activated within a set time;
   wherein the control assembly further includes a left brake handle and a right brake handle, wherein the lower left operating handle and the lower right operating handle are arranged below or directly below a cross-bar part, and the left brake handle and the right brake handle are arranged in front of or directly in front of the cross-bar part.

2. The electric vehicle according to claim 1, wherein the main body includes:
   a frame,
   a body arranged on the frame,
   a handle arranged on the body, and
   the controller is arranged on the handle.

3. The electric vehicle according to claim 2, further comprising:
   a power supply assembly arranged at the rear or bottom of the body, wherein the power supply assembly includes
   a battery pack accommodating part arranged on the body through a fixing part, and
   a battery pack arranged in the battery pack accommodating part.

4. The electric vehicle according to claim 3, wherein the battery pack accommodating part includes a side wall and a bottom wall, and
   the fixing part includes a mounting plate extending from the side wall to both sides and a fastener, wherein the fastener fixes the mounting plate on the body.

5. The electric vehicle according to claim 3, wherein a key holder and a safety key are provided at an opening of the battery pack accommodating part, wherein the safety key is used to control the conduction and disconnection of the battery pack.

6. The electric vehicle according to claim 1, wherein the controller includes a switch button to control the start and stop of the hub motor,
   the traveling wheels include drive wheels and supporting wheels, and
   the hub motor is arranged on the drive wheels.

7. An electric vehicle comprising:
   a main body;
   traveling wheels, arranged on the main body;
   a drive assembly, arranged on the main body, including a hub motor which is arranged on the traveling wheels; and
   a control assembly, arranged on an armrest frame, to control the electric vehicle,
   wherein the control assembly includes a control panel;
   wherein
   the control assembly comprises:
      a start button,
      a lower left operation handle, and
      a lower right operation handle, and
   when the lower left operation handle and the lower right operation handle are released, a braking structure of the electric vehicle will be activated within a set time;
   wherein the control assembly further includes a left brake handle and a right brake handle, wherein the lower left operating handle and the lower right operating handle are arranged below or directly below a cross-bar part, and the left brake handle and the right brake handle are arranged in front of or directly in front of the cross-bar part.

8. The electric vehicle according to claim 7, wherein the control panel includes
a power display area to display the power of the power supply assembly, or
a forward and a backward button to control the moving direction of the electric vehicle.

9. The electric vehicle according to claim 7, wherein
the control panel further includes a membrane key assembly which is pasted on the control panel,
the control assembly includes a speed control button to adjust a moving speed of the electric vehicle.

10. The electric vehicle according to claim 7, wherein
the lower left operating handle and the lower right operating handle are arranged on
the control assembly through a pivot shaft.

11. The electric vehicle according to claim 10, wherein
the armrest frame includes
a frame body, including
a cross-bar part, and
a pair of arm parts formed by bending outwards from both ends of the cross-bar part, wherein an axis of the pivot shaft is perpendicular to a plane where the cross-bar part is located, and
a bar, arranged on the frame body.

12. The electric vehicle according to claim 7, wherein the lower left operating handle and the lower right operating handle are provided with a resisting arm.

13. The electric vehicle according to claim 7, further comprising,
a power supply assembly, which is arranged on the armrest frame, and includes
a battery pack to supply power to the drive assembly, the battery pack capable of being installed on other garden tools/electric tools to provide electrical energy.

14. The electric vehicle according to claim 11, further comprising a quick clip lock, which arranges the power supply assembly on a side of the armrest frame away from the main body or a side of the armrest frame close to the main body.

15. The electric vehicle according to claim 14, wherein
the quick clip lock includes
a connecting rod, passing through the power supply assembly and the corresponding arm part,
a knob, arranged at one end of the connecting rod, and
a quick clip handle, arranged at the other end of the connecting rod, wherein
the quick clip handle and the power supply assembly are arranged on a same side of the armrest frame.

16. The electric vehicle according to claim 15, wherein
the quick clip lock further includes a spacer block arranged between the quick clip handle and the arm part, and
the quick clip handle includes an eccentric part that matches with the corresponding spacer block.

17. The electric vehicle according to claim 13, wherein
the power supply assembly includes a bearing plate, and
the bearing plate includes
a plate-shaped part arranged between a pair of arm parts of the armrest frame, and
cooperating parts arranged at opposite ends of the plate-shaped part and matched with the corresponding arm parts.

18. The electric vehicle according to claim 13, wherein
the power supply assembly includes at least two of the battery packs, and
the at least two of the battery packs are connected in series or in parallel to be electrically connected to the drive assembly, or
the at least two of the battery packs are capable of switchably and individually supply power to the drive assembly.

\* \* \* \* \*